(12) United States Patent
Can

(10) Patent No.: US 12,219,095 B2
(45) Date of Patent: *Feb. 4, 2025

(54) SYSTEM AND METHOD FOR PROVIDING PERSONALIZED CUSTOMER EXPERIENCE IN INTERACTIVE COMMUNICATIONS

(71) Applicant: Capital One Services, LLC, McLean, VA (US)

(72) Inventor: Aysu Ezen Can, Cary, NC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,516

(22) Filed: Feb. 8, 2024

(65) Prior Publication Data

US 2024/0179243 A1 May 30, 2024

Related U.S. Application Data

(63) Continuation of application No. 17/900,581, filed on Aug. 31, 2022, now Pat. No. 11,943,392.

(51) Int. Cl.
*H04M 3/523* (2006.01)
*G10L 15/26* (2006.01)
*G10L 25/27* (2013.01)
*H04M 3/51* (2006.01)

(52) U.S. Cl.
CPC .......... *H04M 3/5235* (2013.01); *G10L 15/26* (2013.01); *G10L 25/27* (2013.01)

(58) Field of Classification Search
None
See application file for complete search history.

(56) References Cited

U.S. PATENT DOCUMENTS

| | | |
|---|---|---|
| 8,265,261 B1 | 9/2012 | Adamson et al. |
| 8,411,841 B2 | 4/2013 | Edwards et al. |
| 9,124,697 B2 | 9/2015 | Scott et al. |
| 9,160,852 B2 | 10/2015 | Ripa et al. |

(Continued)

OTHER PUBLICATIONS

Piccoli, Gabriele, Tsz-Wai Lui, and Bettina Gron. "The impact of IT-enabled customer service systems on service personalization, customer service perceptions, and hotel performance." Tourism Management 59 (2017): 349-362; 14 pages.

(Continued)

*Primary Examiner* — Harry S Hong
(74) *Attorney, Agent, or Firm* — Sterne, Kessler, Goldstein & Fox P.L.L.C.

(57) ABSTRACT

Disclosed herein are system, method, and computer program product embodiments for machine learning systems to process incoming call-center calls based on caller preferences. Text of historical interactive communications of a set of first callers are used to train one or more machine learning models to extract caller preferences. These trained models extract caller preferences for a second caller to generate a customer specific profile. An automated call center assistance system is configured to selectively route, based on the customer specific profile, a current call from the second caller to a call center agent and communicate one or more of the caller preferences for the second caller to the call center agent for consideration in an interactive communication during the current call.

20 Claims, 14 Drawing Sheets

(56) References Cited

U.S. PATENT DOCUMENTS

| | | |
|---|---|---|
| 9,900,436 B2 | 2/2018 | Raanani et al. |
| 10,582,054 B2 | 3/2020 | Zhakov |
| 10,708,424 B1 | 7/2020 | Maestas |
| 10,834,262 B2 | 11/2020 | Kalathur et al. |
| 10,972,611 B2 | 4/2021 | Feast et al. |
| 11,019,209 B2 | 5/2021 | Paiva |
| 11,080,721 B2 | 8/2021 | Kannan et al. |
| 11,089,162 B1 | 8/2021 | Traba et al. |
| 11,943,392 B2 * | 3/2024 | Can .................. H04M 3/5235 |
| 2005/0100159 A1 | 5/2005 | Fink et al. |
| 2006/0062376 A1 | 3/2006 | Pickford |
| 2015/0201077 A1 | 7/2015 | Konig et al. |
| 2018/0115645 A1 | 4/2018 | Iyer |
| 2021/0004836 A1 | 1/2021 | Adibi et al. |
| 2022/0400179 A1 | 12/2022 | DiMaria et al. |

OTHER PUBLICATIONS

Cena, Federica, and Ilaria Torre. "Increasing performances and personalization in the interaction with a call center system." Proceedings of the 9th international conference on Intelligent user interfaces. 2004. file:///Users/cib224/Downloads/Increasing_performances_and_personalization_in_the.pdf; 3 pages.

* cited by examiner

SYSTEM AND METHOD FOR PROVIDING PERSONALIZED CUSTOMER EXPERIENCE IN INTERACTIVE COMMUNICATIONS

CROSS-REFERENCE TO RELATED APPLICATIONS

This application is a continuation of U.S. patent application Ser. No. 17/900,581 entitled "System and Method for Providing Personalized Customer Experience in Interactive Communications" filed Aug. 31, 2022, which is herein incorporated by reference in its entirety.

BACKGROUND

Text and speech may be analyzed by computers to discover words and sentences. However, missing in current computer-based text/speech analyzers is an ability to properly recognize user requirements or preferences based on their speech. Currently, no matter how long a customer has had business with a company, call centers will start a discussion from scratch and therefore fail to anticipate personal preferences or needs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
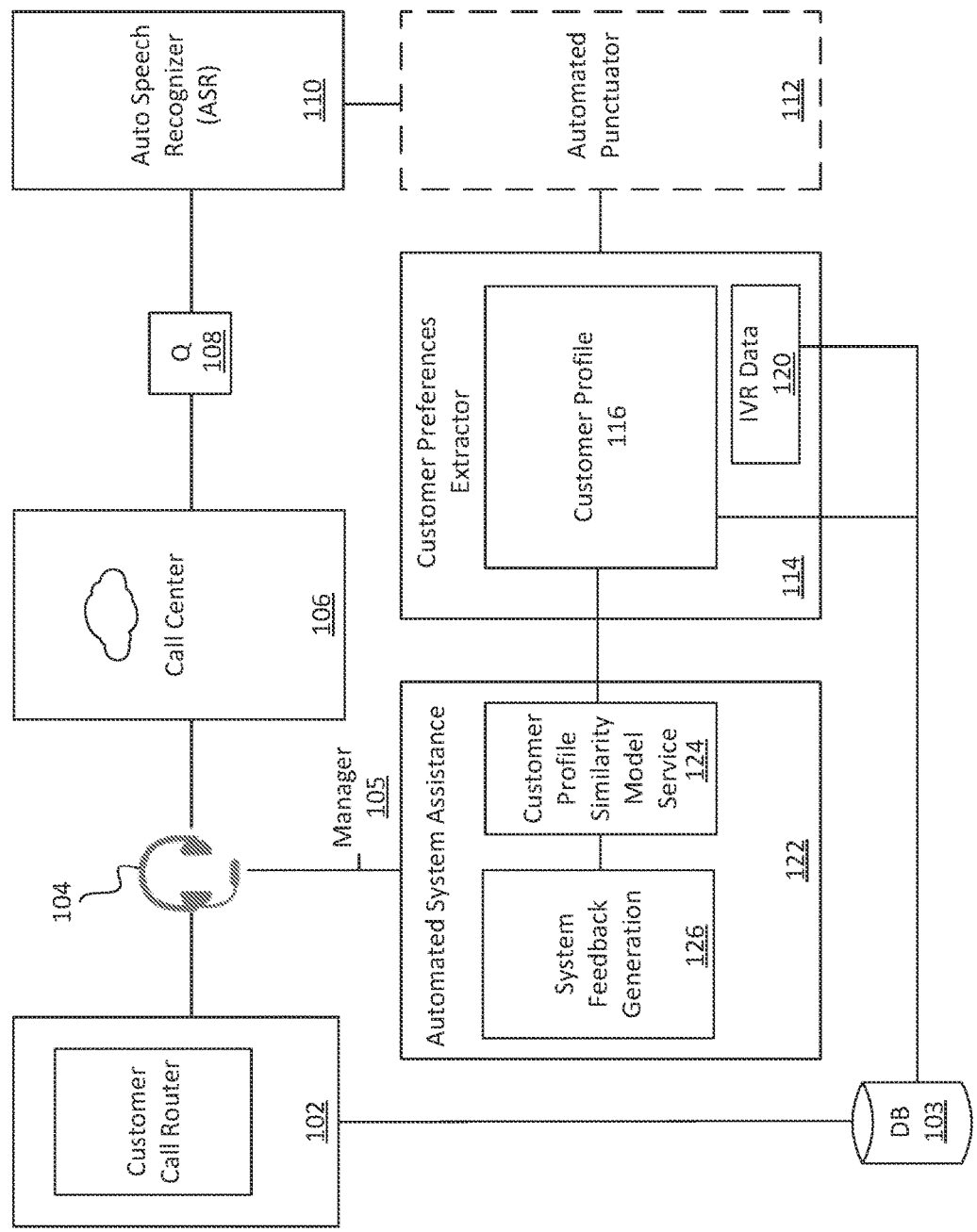
FIG. 1 is a flow diagram for a call center system processing an incoming call, according to some embodiments.

Provided herein are system, apparatus, device, method and/or computer program product embodiments, and/or combinations and sub-combinations thereof to provide real-time recognition of user preferences to improve customer experience. Customer experience is core to many businesses and a crucial aspect of a positive customer experience may be solving customers' problems in a quick and effective manner. Additionally, there is business value in improving customer experience in terms of both company reputation and customer retention. Embodiments disclosed herein provide a technical solution to derive user information related to satisfaction from an interactive communication and leverage this information to provide real-time personalization of the interactive communications.

Customer call centers today currently treat each interaction the same and do not utilize previous interactions with a customer nor take caller preferences into account. This creates a generic experience where customers do not feel special or valued. Providing the best customer experience possible is a key component of increasing customer satisfaction and therefore creating more business opportunities. In some embodiments, the technology described herein personalizes customer interactions in a customer call center. In a non-limiting example, the call center system implements technical improvements to inform call agents about customer's preferences, such as word choices, call length, average customer satisfaction, frequency of complaints so that agents can shape the conversations and provide a more personalized experience to each and every customer. In this way, the customer feels that their historical interactions have been taken into account and they are not just another customer. In some embodiments, a customer profile may be generated based on the caller's previous call history, with subsequent interactions customized to one or more components of the profile.

Customer service call centers lie in the heart of interactions with customers and are a crucial front to improve customer satisfaction. However, it is not trivial to improve customer experience in call centers due to several reasons, such as, the characteristics of customers differ, topics for which customers are calling about are constantly changing, and call agent allocation is an optimization problem where cost and effectiveness has to be balanced. In some embodiments, the technology described herein is configured to personalize a caller's experience to improve customer satisfaction. Currently, call centers may start every call discussion from scratch and may not recognize or pay attention to a caller's personal preferences or needs. In some embodiments, the technology described herein is configured to provide insightful information about customer preferences to call agents so that customers can feel that they have a connection to the company, they are valued and their preferences are taken into account. In some embodiments, this insightful information about customer preferences may be used to route an incoming call or to determine call agent resources needed.

In some embodiments, the technology described herein includes a system that analyzes past interactions of a customer with the call center as well as previous activities related to a customer's account so that it can extract information automatically to help call agents provide a personalized experience. The customers should not feel as if they are starting from scratch every time they call customer service center, but instead, feel that their voice is heard. These insights are provided to the call agents before as well as during the call so that agents have an understanding of what to expect, which wordings to choose and how to communicate with the particular customer. Real-time assistance is key to providing the best support to agents. In various embodiments, assistance is provided while a call is in progress in order to improve customer interaction in real time.

In some embodiments, the technology described herein processes incoming call-center calls based on inferred (machine learning model) preferences. In a non-limiting example, machine learning models analyze a number of complaints and corresponding complaint types of previous calls of a customer in order to route the call accordingly. In another non-limiting example, the machine learning models analyze previous satisfaction ratings of a customer and compare it to other customers to route the call accordingly. In another non-limiting example, the machine learning models compare average call length of the current customer and compare it to other customers to set expectations for the call agent before the call starts. In another non-limiting example, the machine learning models analyze an average resolution time of calls in a given time period to aid in call agent coaching. In another non-limiting example, the machine learning models analyze a trend in the average resolution time of calls to interfere when there is an uptick in the resolution times. In another non-limiting example, the machine learning models utilize a last call reason for calling and the number of times that customer needed to call for the same call reason in order to predict the call reason of an upcoming call. In another non-limiting example, the machine learning models utilize an average Net Promoter Score (NPS) of a given customer and compare it against other customers to assist with call routing. In another non-limiting example, the machine learning models utilize a distribution of previous call reasons to predict the likely call reasons for the upcoming calls and map the customer to a call agent that can assist with the likely topics. In another non-limiting example, the machine learning models analyze a distribution of complaints in a customer's call history to select the most appropriate call agent (manager or agent) for the upcoming call. In another non-limiting example, the machine learning models analyze the average amount of time it takes for a given customer to have a complaint during a call and alert a call agent in real time for a possible complaint. In another non-limiting example, the machine learning models analyze the average number of words there are in the conversation for a given customer to have a complaint during a call and alert a call agent in real time for a possible complaint. In another non-limiting example, the machine learning models extract the most frequently used complaint words for a given customer so that a call agent personalizes the interaction according to the customer. In another non-limiting example, the machine learning models utilize agent versus customer satisfaction mapping to determine which call agent should take the next call for a given customer. In another non-limiting example, the machine learning models extract cues from calls with high customer satisfaction for a given customer in order to plan for upcoming calls. In another non-limiting example, the machine learning models investigate a relationship between a number of call transfers and customer satisfaction for a given customer, so that agents can try not to exceed a certain number of transfers if it is found to decrease satisfaction highly for the customer. In another non-limiting example, the machine learning models extract most frequently used positive and negative sentiment phrases for similar customers so that agents can tailor their conversation based on the customer. In another non-limiting example, the machine learning models forecast resource requirements for the upcoming time period (e.g., number of call agents needed for the next hour) and dynamically allocate more resources as needed.

While providing a few non-limiting examples above, any user preference related information may be used to route an incoming call or warn, inform or otherwise assist a corresponding call agent to improve an outcome of the call and improve user experience.

Properly captured caller preferences, as described herein, is one element leading to higher correlated solutions. As such, the technology described herein improves how a computer identifies a caller's preferences, thereby improving the operation of the computer system itself.

In some embodiments, the call center system may be configured with an automated assistance module to suggest, based on the inferred customer preferences, phrases that the agent can use in their current dialogue with the customer. Optionally, call center managers may be alerted so that they can decide whether to tune in to a particularly problematic call or to provide help.

Throughout the descriptions, a Net Promoter Score (NPS) may be used as a metric to gauge customer satisfaction. This known scoring mechanism is typically generated through surveys communicated to the customer after they are finished with a call. In one non-limiting example, customers may select a value between 1-10, indicating how satisfied they are with the service. For calls where a previous customer survey exists, a previous score provided by the customer may provide caller insight at an initiation of a new call. For new calls that do not have a previous survey score (i.e., customer did not fill out the survey), the call center system may implement a machine learning model that predicts the score given the previous call transcript or predicts satisfaction as the new call proceeds. Customer satisfaction does not have to be gauged via NPS, there are other known metrics for this purpose. However, NPS is one metric utilized in one or more examples described herein.

Throughout the descriptions, the terms "caller", "customer" and "user" may be interchangeably used.

FIG. 1 illustrates an example call center system 100 processing an incoming interactive communication such as a customer call, as per some embodiments. System 100 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. Call center architecture 100 (call center system) may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It is to be appreciated that not all components may be needed to perform the disclosure provided herein. Further, some of the processes described may be performed simultaneously, or in a different order or arrangement than shown in FIG. 1, as will be understood by a person of ordinary skill in the art. System 100 shall be described with reference to FIG. 1. However, system 100 is not limited to this example embodiment. In addition, system 100 will be described at a high level to provide an overall understanding of one example call flow from incoming call to call agent assistance. Greater detail will be provided in the figures that follow.

Customer Call Router 102 provides call routing to a call agent 104 of call center 106. Currently, most call routing is performed through an Interactive Voice Response system (IVR). The IVR is an automated phone system with call routing capabilities that allows customers to interact with a virtual assistant before speaking with an agent. The virtual assistant is essentially a prerecorded voice menu that can be navigated verbally or manually and collects information about the customer inquiry before automatically transferring the call to the most appropriate queue.

In some embodiments, the technology described herein may be configured to analyze customer historical call data to train a machine learning model (call routing predictive model 336) to automatically route calls through Customer Call Router 102. A customer profile 116 may contain customer profile data derived from previous calls, such as, customer interactions with products and services. The customer profile helps determine where to route a customer's next call based on their previous activity. To predict which queue to route a customer call to, the system identifies all possible queues and the caller's profile. Having identified the queues' common call profiles, the system frames this as a classification problem. Training labels may include instances when a customer's preferences, using an original queue, were routed to and when a customer was transferred between agent queues 108. In some embodiments, initial training data may be sourced, for example, from a current IVR database 120, which routes customers based on the reason they provide the system for calling in. As customer preferences are captured, they may be stored as a composite profile, in database (DB) 103, to also include historical customer activities or IVR data.

Call centers receive hundreds of thousands of calls daily. These calls may be transcribed from speech recordings to text using an automatic speech recognizer (ASR) 110. The ASR output is a sequence of words that begin when the caller begins speaking and ends only once there is a significant duration of silence or the call ends. This text may therefore contain many sentences with no visible boundaries between them and no punctuation. Additionally, given the spontaneous nature of spoken language, the text frequently contains disfluencies, for example, filler words, false starts, incomplete phrases, and other hallmarks of unrehearsed speech. These disfluencies are not marked, and are interleaved with the rest of the speech. This may further obscure the meaningful portions of the text. The lack of punctuation and boundaries in the ASR output may cause difficulty for humans or computers analyzing, reading, or processing the text output, and cause problems for downstream models, which benefit from clearly delineated syntactic boundaries in the text. Therefore, an optional automatic punctuator 112 may punctuate the output text of ASR to make the text better understandable to a reader or machine.

The text string refers to a sequence of words that are unstructured (i.e., may not be in sentence form and contain no punctuation marks). In one embodiment, the text string may be generated based on an automatic speech recognition (ASR) machine learning model 322 transcribing speech recordings to text. Based on the transcription and the spontaneous nature of spoken language, the text string likely contains errors or is incomplete. The errors may include, for example, incorrect words, filler words, false starts to words, incomplete phrases, muted or indistinguishable words, or a combination thereof, that make the text string unreadable or difficult to understand by a human or computer.

In one embodiment, the text string may be output directly from the ASR 110. In another embodiment, the text string may be received from a repository, database, or computer file that contains the text string. For example, in one embodiment, the text string may be generated by the ASR 110 and saved to a repository, database, or computer file, such as a .txt file or Microsoft Word™ file, as examples, for retrieval and receipt by optional automated punctuator 112.

In one embodiment, once the text string is generated, the text string may be converted from text or character format into a numerical format by the system 100. In one embodiment, the conversion may be performed by converting each word of the text string into one or more tokens (see semantic analyzer 206). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (i.e., contextualized word embeddings) of each of the tokens into a vector representation. The contextualized vectors are generated through the processes and methods used in language models such as the BERT and ROBERTa language models, which are known in the art. For the purposes of discussion throughout this application it is assumed that the contextualized vectors are generated based on such processes and methods.

Continuing with the example, the one or more tokens may be generated based on a variety of criteria or schemes that may be used to convert characters or text to numerical values. For example, in one embodiment, each word of a text string can be mapped to a vector of real values. The word may then be converted to one or more tokens based on a mapping of the word via a tokenization process. Tokenization processes are known in the art and will not be further discussed in detail here.

In one embodiment, the formatted text string may further be transmitted for display or may be transmitted to a repository, database, or computer file, such as a .txt file or Microsoft Word™ file, as examples, to be saved for further retrieval by a user or components of the system 100.

Customer Preferences Extractor 114 recognizes and extracts caller preferences. While shown as a single extractor component, the extractor may be implemented by a single or a plurality of components, such as one or more machine learning models 306 (FIG. 3), collectively capturing a specific caller's preferences. The extraction may include an analysis of various selected data points within a historical record of previous calls from the same caller. For example, data points may be the customer's reason for calling, average call length, average resolution time or satisfaction level, to name a few. The extracted preferences may be used to build a customer profile 116 for future call routing as well as providing real-time automated system assistance 122 through the call agent 104 or manager 105.

After collecting data points regarding the customer and call as previously described above, the system aggregates this information into, for example, a single unit of analysis, to generate a customer profile 116. The customer profile may, in some embodiments, contain both metadata related to the customer, collected in an offline manner, as well as information collected by the various predictive models, which is iteratively updated as the call proceeds. A customer profile may contain a mix of data types, which are vectorized as part of any similar-customer comparison. All data types are vectorized and then concatenated to form a single fixed-length vector. The Customer Preferences Extractor 114 may implement trend scoring based on a trend of accumulated profile component scores over time. Trend data may be updated in a composite customer profile stored in database 103.

In a non-limiting satisfaction trend approach, a satisfaction trend may be calculated in the following ways: 1. Model-predicted satisfaction scores can be aggregated on a daily, weekly, or monthly basis to obtain satisfaction scores over time. With this time-series, deviations can be determined by applying a trend detection algorithm measuring changes in the mean and/or slope. 2. A customer-specific trend score may be calculated by tracking satisfaction scores for a customer across calls. For example, the real-time satisfaction detector module 114 may predict trend scores for all customer X's previous calls to obtain X's time-series. The system may monitor these trend scores to detect when a deviation occurs, such as a very negative call, or calculate the moving average to determine when a customer's experience drops below a threshold. Calls can be identified for further investigation of coaching opportunities and improvement to call center processes.

For real-time trends, the model can predict continuously as the call is transcribed. This generates a real-time trend score that updates as the call progresses. A trend may be detected when the real-time score deteriorates significantly. When a downward trend is detected, it should be remedied at that time or soon thereafter.

For offline trend detection, an intervention may be triggered so that: 1) managers and/or stakeholders are alerted to the trend, 2) analysts are notified of specific trends for further exploration, 3) customers affected by the trend may be contacted for remediation. In the case of a real-time trend, the customer may be transferred to a manager or specialist.

Automated System Assistance 122 provides notifications (e.g., alerts), phrasing and redirection to a manager to provide automated assistance during a call based on the customer profile 116. In one embodiment, Automated System Assistance 122 uses a similar customer predictive model 332 to find customers similar to the current customer in order to drive insights into what actions resolved their complaints and what language helped increase customer satisfaction. To this end, a customer profile similarity model service 124 may group previous customers based on their similarities to the current customer and finds the closest cluster of customers. Using this most similar group, the system extracts a list of previously successful actions. The system provides these actions to the System Feedback Generation module 126 to present real-time support to call agents 104 in the form of alerts or current call dialog suggestions (e.g., phrases).

To link customers by their profiles, the system relies on a family of approaches standard in product recommender systems. This involves vectorizing customer information into a common format and using vector-based similarity metrics to cluster these customers. 1. Presume a "warm start" scenario, i.e., the customer has a transaction or call history. However, if no customer information exists, as commonly occurs with new cardholders (the "cold start" problem), the system starts with basic metadata such as call reason as detected from the IVR and updates customer vectors in real-time as new information becomes available from the machine learning models.

In general, customer similarity can be viewed as customers who interact with company products/services in a similar way (own the same credit cards, have similar spending habits, etc.). These features may be embedded in a vector space and with similarities computed across a customer base. Model-score-based similarity provides that, given a current call, the system may calculate previously mentioned features (e.g., sentiment score, call reason, complaint detection, etc.). Calculating these on each utterance allows the system to obtain a distribution over time. This information may be vectorized and compared with previous calls (e.g., cosine distance). The most similar calls may be provided as a reference, particularly the previous call agent's notes and actions. This can give the current agent a suggestion as to what the best next steps are.

In one embodiment, the system may also incorporate ontology-based information into vectors. This involves extracting, for example, 15 phrases from transcripts and resolving these to concepts for a customer. Ontology uses an entity-linking model. For example, given the phrase "chip in my card isn't working" in Customer Profile x and the phrase "chip has scuff marks" in Customer Profile y, an entity-linking model resolves these to the concept "card_broken." This concept may then be embedded in a vector space along with other available data points.

System Feedback Generation 126 organizes system feedback in a manner accounting for the user preferences. To this end, the system may use color coded alerts to gauge customer satisfaction and categorize system feedback. A customer's last satisfaction level (gauge) and average over a period of time is predicted for each utterance. This information can be summarized and provided to managers 105 for coaching and discussion to develop a better customer experience.

The system measures customer satisfaction using, but not limited to, two main metrics: a satisfaction score (e.g., NPS) and a sentiment score. Other satisfaction measures are considered within the scope of the technology described herein. Both are predicted in real-time at an utterance level. Call agents may be provided with both while talking to customers, making it easy to absorb information, so that the call agents can focus on the call itself. To simplify information consumption, the metrics may be presented, for example, in the form of a color-coded gauge that changes throughout the call.

Therefore, the technology described herein solves one or more technical problems that exist in the realm of online computer systems. One problem, proper identification of a caller's preferences, prevents other systems from properly correlating preferences with corresponding caller interactions and solutions (based on an intelligently identified profile). The technology as described herein provides an improvement in properly identifying a caller's preferences and preference trends that increases a likelihood of a correlation with a real-time solution, such as, in the automated system assistance module 122 or in the call router 102, and subsequently a successful outcome of the call. Therefore, one or more solutions described herein are necessarily rooted in computer technology in order to overcome the problem specifically arising in the realm of computer networks (e.g., call center systems). The technology described herein reduces or eliminates this problem of an inability for a computer to properly capture customer preferences or preference trends as described in the various embodiments of FIGS. 1-13.

While shown as separate databases (120 and 103), profiles, metadata, IVR data, trend data, etc. may be stored locally in computer memory or stored in one or more locations within distributed storage system (e.g., data centers).

Figure 2:
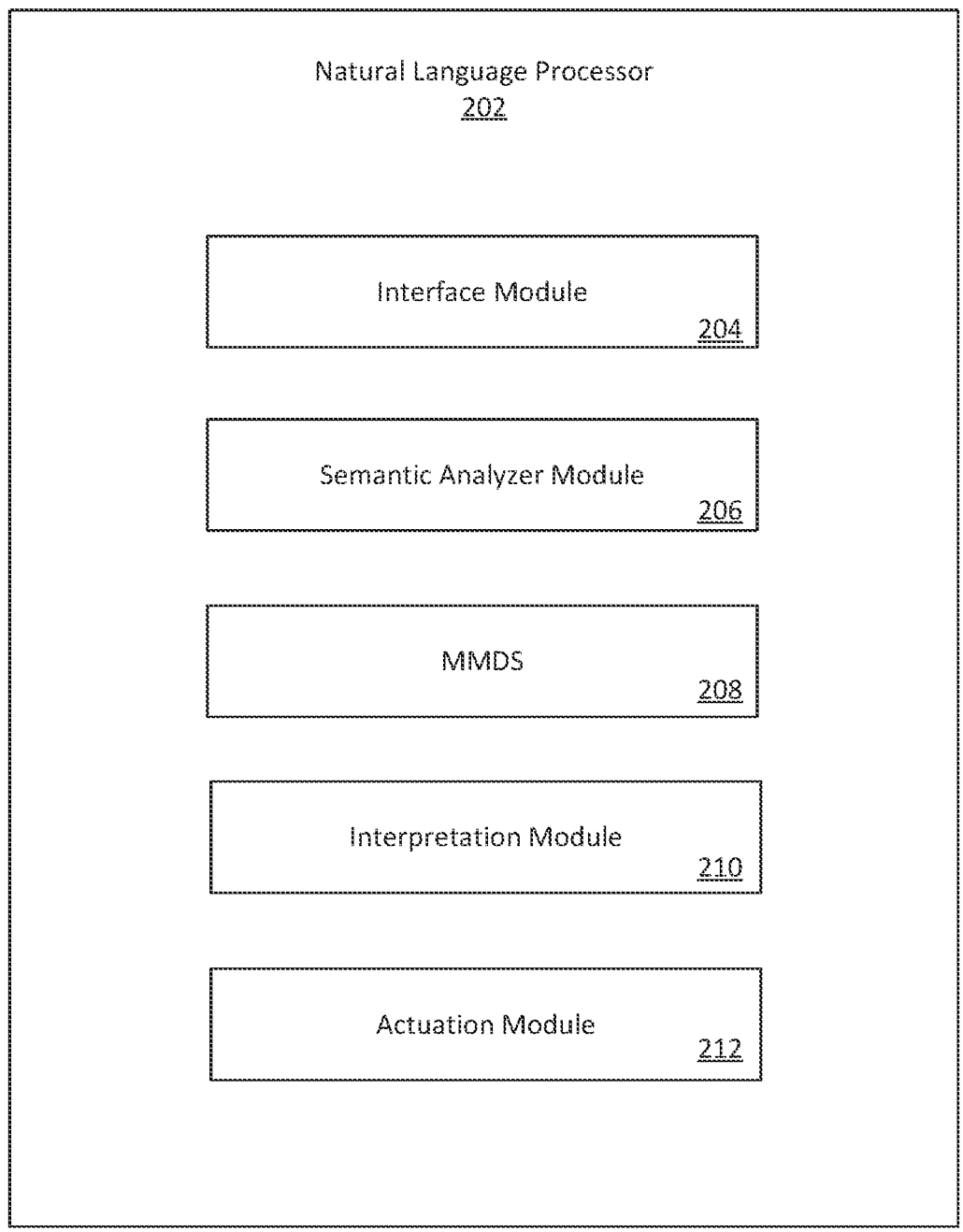
FIG. 2 is a block diagram for natural language processing of an incoming call, according to some embodiments.

FIG. 2 is a block diagram of a Natural Language Processor (NLP) system 200, according to some embodiments. The number of components in system 200 is not limited to what is shown and other variations in the number of arrangements of components are possible, consistent with some embodiments disclosed herein. The components of FIG. 2 may be implemented through hardware, software executing on a processing device, and/or firmware. As used herein, the term non-recurrent neural networks, which includes transformer networks, refers to machine learning processes and neural network architectures designed to handle ordered sequences of data for various natural language processing (NLP) tasks. NLP tasks may include, for example, text translation, text summarization, text generation, sentence analysis and completion, determination of punctuation, or similar NLP tasks performed by computers.

As illustrated, system 200 may comprise a Natural Language Processor (NLP) 202. NLP 202 may include any device, mechanism, system, network, and/or compilation of instructions for performing natural language recognition of caller preferences, consistent with the technology described herein. In the configuration illustrated in FIG. 2, NLP 202 may include an interface module 204, a semantic analyzer 206, a Master and Metadata Search (MMDS) module 208, an interpretation module 210, and/or an actuation module 212. In certain embodiments, modules 204, 206, 208, 210, and/or 212 may each be implemented via any combination of hardware, software, and/or firmware.

Interface module 204 may serve as an entry point or user interface through which one or more utterances, such as spoken words/sentences (speech), may be entered for subsequent recognition using an automatic speech recognition model 322. While described for spoken words throughout the application, text may also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface module 204 may facilitate information exchange among and between NLP 202 and one or more users (callers) and/or systems. Interface module 204 may be implemented by one or more software, hardware, and/or firmware components. Interface module 204 may include one or more logical components, processes, algorithms, systems, applications, and/or networks. Certain functions embodied by interface module 204 may be implemented by, for example, HTML, HTML with JavaScript, C/C++, Java, etc. Interface module 204 may include or be coupled to one or more data ports for transmitting and receiving data from one or more components coupled to NLP 202. Interface module 204 may include or be coupled to one or more user interfaces (e.g., a speaker, microphone, headset, or GUI).

In certain configurations, interface module 204 may interact with one or more applications running on one or more computer systems. Interface module 204 may, for example, embed functionality associated with components of NLP 202 into applications running on a computer system. In one example, interface module 204 may embed NLP 202 functionality into a Web browser or interactive menu application with which a user (call agent) interacts. For instance, interface module 204 may embed GUI elements (e.g., dialog boxes, input fields, textual messages, etc.) associated with NLP 202 functionality in an application with which a user interacts. Details of applications with which interface module 204 may interact are discussed in connection with FIGS. 1 and 3-13.

In certain embodiments, interface module 204 may include, be coupled to, and/or integrate one or more systems and/or applications, such as speech recognition facilities and Text-To-Speech (TTS) engines. Further, interface module 204 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface module 204 may receive natural language queries (e.g., word, phrases or sentences) from a caller and forward the queries to semantic analyzer 206.

Semantic analyzer 206 may transform natural language queries into semantic tokens. Semantic tokens may include additional information, such as language identifiers, to help provide context or resolve meaning. Semantic analyzer 206 may be implemented by one or more software, hardware, and/or firmware components. Semantic analyzer 206 may include one or more logical components, processes, algorithms, systems, applications, and/or networks. Semantic analyzer 206 may include stemming logic, combinatorial intelligence, and/or logic for combining different tokenizers for different languages. In one configuration, semantic analyzer 206 may receive an ASCII string and output a list of words. Semantic analyzer 206 may transmit generated tokens to MMDS module 208 via standard machine-readable formats, such as the extensible Markup Language (XML).

MMDS module 208 may be configured to retrieve information using tokens received from semantic analyzer 206. MMDS module 208 may be implemented by one or more software, hardware, and/or firmware components. MMDS module 208 may include one or more logical components, processes, algorithms, systems, applications, and/or networks. In one configuration, MMDS module 208 may include an API, a searching framework, one or more applications, and one or more search engines.

MMDS module 208 may include an API, which facilitates requests to one or more operating systems and/or applications included in or coupled to MMDS module 208. For example, the API may facilitate interaction between MMDS 208 and one or more structured data archives (e.g., knowledge base).

In certain embodiments, MMDS module 208 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 208 may initialize the data index, perform delta indexing, collect metadata, collect master data, and administer indexing. Such a searching framework may be included in one or more business intelligence applications (e.g., helpdesk, chatbots, voice interactive modules, etc.)

In certain configurations, MMDS module 208 may include or be coupled to a low level semantic analyzer, which may be embodied by one or more software, hardware, and/or firmware components. The semantic analyzer may include components for receiving tokens from semantic analyzer 206 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS module 208 may leverage various components and searching techniques/algorithms to search the data index using tokens received by semantic analyzer 206. MMDS module 208 may leverage one or more search engines that employ partial/fuzzy matching processes and/or one or more Boolean, federated, or attribute searching components. By way of non-limiting examples, similar customers, similar calls (e.g., similar complaints) or positive/negative call outcomes may be discovered using the various described searching components. Although, one skilled in the art will appreciate other approaches to identify these similar elements may be used or contemplated within the scope of the technology described herein.

In certain configurations, MMDS module 208 may include and/or leverage one or more information validation processes. In one configuration, MMDS module 208 may leverage one or more languages for validating XML information. MMDS module 208 may include or be coupled to one or more clients that include business application subsystems.

In certain configurations, MMDS module 208 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

Figure 3:
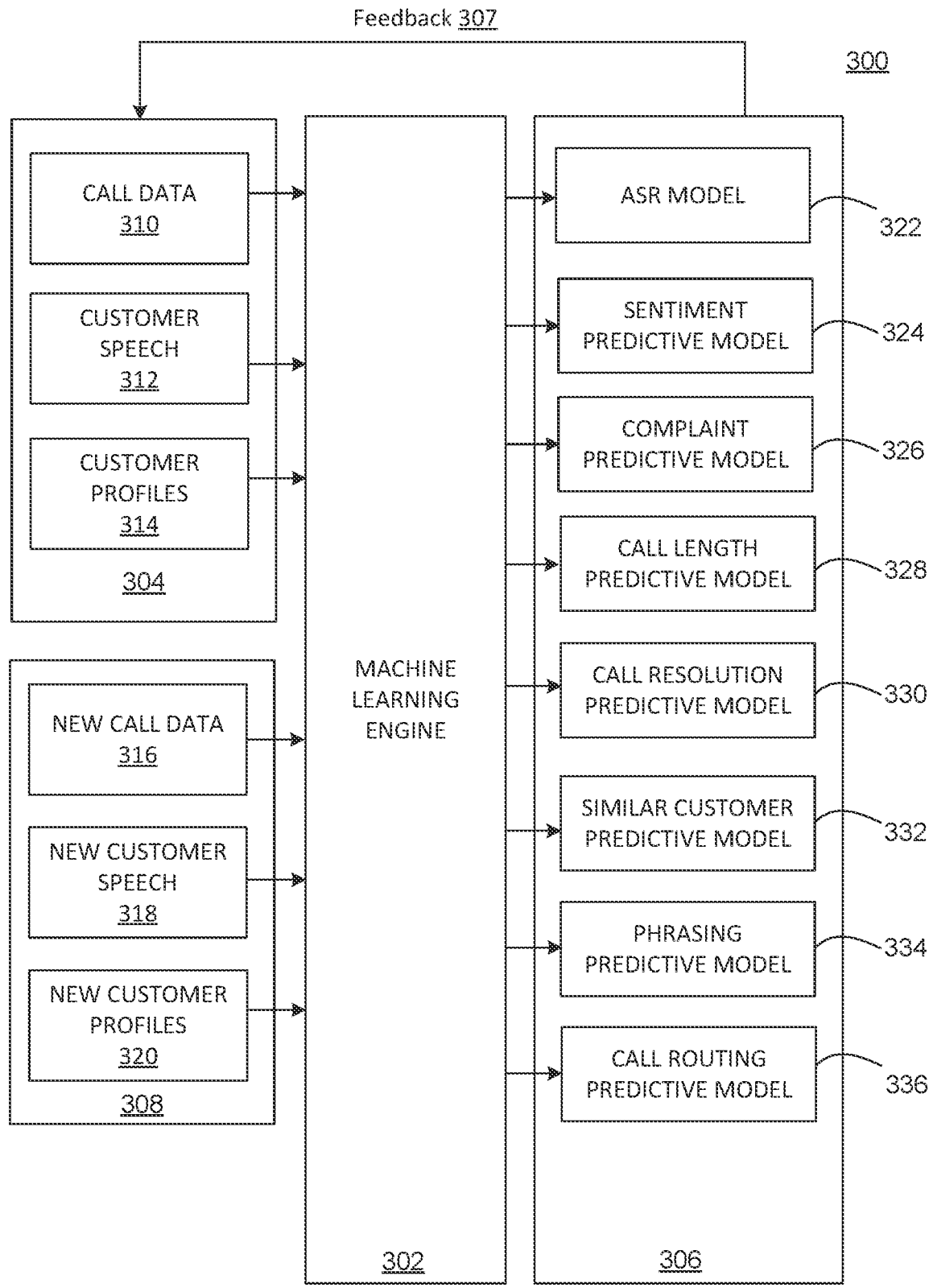
FIG. 3 is a block diagram for processing an incoming call with machine learning, according to some embodiments.

In one configuration, MMDS module 208 may include one or more machine learning components as discussed further in association with FIG. 3. Learning components may be forwarded to and/or included in interpretation module 210. MMDS module 208 may output to interpretation module 210 a series of meta and/or master data technical addresses, associated field names, and any associated description fields. MMDS module 208 may also output matching scores to interpretation module 210.

Interpretation module 210 may process and analyze results returned by MMDS module 208. Interpretation module 210 may be implemented by one or more software, hardware, and/or firmware components. Interpretation module 204 may include one or more logical components, processes, algorithms, systems, applications, and/or networks. In one example, interpretation module 204 may include matching policy conditions against tokenized natural language queries and context information.

Consistent with embodiments of the present invention, interpretation module 210 may be configured to recognize information identified by MMDS 208. For example, interpretation module 210 may identify ambiguities, input deficiencies, imperfect conceptual matches, and compound commands. In certain configurations, interpretation module 210 may initiate, configure, and manage user dialogs (e.g., text scripts); specify and manage configurable policies; perform context awareness processes; maintain context information; personalize policies and perform context switches; and perform learning processes.

Interpretation module 210 may provide one or more winning combinations of data elements to actuation module 212. Interpretation module 210 may filter information identified by MMDS module 210 in order to extract information that is actually relevant to spoken inputs. That is, interpretation module 210 may distill information identified by MMDS module 208 down to information that is relevant to the words/sentences and in accordance with intent. Information provided by interpretation module 210 (i.e., winning combination of elements) may include function calls, metadata, and/or master data. In certain embodiments, the winning combination of elements may be arranged in a specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuation module 212 may process interpreted information provided by interpretation module 210. Actuation module 212 may be implemented by one or more software, hardware, and/or firmware components. Actuation module 212 may include one or more logical components, processes, algorithms, systems, applications, and/or networks. Actuation module 212 may be configurable to interact with one or more system environments.

Consistent with embodiments of the present invention, actuation module 212 may be configured to provide information (e.g., customer profile 116) to one or more users/systems as shown in FIG. 1). In such embodiments, actuation module may interact with one or more information display devices.

In certain embodiments, actuation module 212 may be configured to send requests to one or more devices and/or systems using, for example, various APIs. Actuation module 212 may generate one or more presentations based on responses to such commands.

For clarity of explanation, interface module 204, semantic analyzer 206, MMDS module 208, interpretation module 210, and actuation module 212 are described as discrete functional elements within NLP 202. However, it should be understood that the functionality of these elements and modules may overlap and/or may exist in fewer elements and modules. Moreover, all or part of the functionality of these elements may co-exist or be distributed among several geographically-dispersed locations.

FIG. 3 is a block diagram of a machine learning system, according to some embodiments. A machine learning system 300 may include a machine learning engine 302 of one or more servers (cloud or local) processing audio text (speech), such as words, phrases or sentences, to recognize relationships of words (e.g., within sentences) received by natural language system 200. As described in various embodiments, machine learning engine 302 is configured to route incoming calls, provide relevant phrasing to a call agent or manager to provide real-time assistance, or to determine call center staffing requirements, to name a few. While described in stages, the sequence may include more or less stages or be performed in a different order. In addition, while shown as a plurality of separate machine learning trained models, these models may be combined in any fashion and may include more or less models to discover preferences of a caller.

In the below described embodiments, a specific caller's historical information may be processed by machine learning system 300 to ascertain various indicators of that caller's preferences as described in greater detail hereafter. For example, the system may recognize and extract any of number of caller preference indicators, such as, a count of their number of previous calls, average time on these calls, average resolution time, average call length, call reasons, complaints, frequency of complaints, distribution of complaints, average customer satisfaction, frequently used words, satisfaction, number of transfers, phrasing, etc. By classifying these preference indicators against historical call data of other callers, a profile or at least a partial profile of a specific caller may be generated. A non-limiting example of a partial profile may be where a caller's history lacks one or more of the preference indicators.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 302 may use various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns and associated emotions within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of speech to text conversion, a dataset of audio and word matches may be used.

In some embodiments, machine learning models 306 are trained with other customer's historical information. In addition, large training sets of the other customer's historical information may be used to normalize prediction data (e.g., not skewed by a single or few occurrences of a data artifact). Thereafter, the predictive models may classify a specific caller's historic data (e.g., transcripts) against the trained predictive model to predict preferences and generate or enhance a previous profile. In one embodiment, the customer specific profile is continuously updated as new call instances from this customer occur.

For purposes of discussion, this training data 304 is shown, in a first stage, as call data 310, customer speech data 312, customer profiles 314. However, more or less training data components may be included in the training data 304. For example, known off-line activities of customers or pre-calculated data (e.g., call metrics) may be used as a training input without departing from the scope of the technology described herein. This training data may be ingested to train various predictive models 306. Call data 310 may be any of, but not be limited to, previously computed factors (e.g., indicators) as described above. Customer speech data may reflect recorded calls that may be converted to text, by ASR model 322. Customer profiles 314 may be existing profiles or partial profiles of customers. While described herein as a single profile, it is within the scope of the technology described herein to implement segmented, grouped or aggregated profile data.

In a first case example, an ASR model 322 may be trained based on machine learning engine 302 processing training data set 304. Training a model means learning (determining) values for weights as well as inherent bias from labeled examples. In supervised learning, a machine learning algorithm builds a model by examining many examples and attempting to find a model that minimizes loss; this process is called empirical risk minimization. A language model assigns a probability of a next word in a sequence of words. A conditional language model is a generalization of this idea: it assigns probabilities to a sequence of words given some conditioning context. In some embodiments, a supervised learning approach classifies what components in the customer speech reflect a caller preference based on a machine learning understanding of relationships to corresponding known profile components.

In a second stage, the training cycle continuously looks at results, measures accuracy and fine-tunes the inputs to the modeling engine (feedback loop 307) to improve capabilities of the various predictive models 306.

In addition, as various predictive models (algorithms) 306 are created, they are stored in a database (not shown). For example, as the training sets are processed through the machine learning engine 302, the routing predictive model 322 may change (tuning/fine tuning) and therefore may be recorded in the database.

An incoming call from a previous specific customer, with a previous call history, reflects an input (new data 308) to be analyzed against the trained machine learning models to determine that caller's preferences and build or update their profile. For purposes of discussion, this new data 308 is shown as new call data 316, new customer speech 318 or customer profiles 320. However, more or less training data may be included in the new data 308. For example, known off-line activities of this customer may be used as an input without departing from the scope of the technology described herein.

In some embodiments, ASR machine learning model 322 converts call audio to text for downstream machine model analyses (e.g., by one or more of the machine learning models 324-336), as further described in the following machine learning model sections. The ASR machine learning model may be trained on, for example, hundreds of hours of call recordings with corresponding manual transcriptions (or previously automated transcriptions), and may be implemented with actively developed open source speech recognition toolkits. The features to the model may include Mel-Frequency Cepstrum Coefficients (MFCCs), which represent energy present at various frequency ranges, with ranges chosen to mimic human auditory response. The underlying model methodology leverages a combination of GMMHMM (Gaussian Mixture Modeling and Hidden Markov modeling), Ngram language modeling, and Deep Neural Networks (DNN). The model may achieve a word error rate (WER) of ~15.0%. This is equivalent to inter-transcriber discrepancy by a professional transcriber and thus represents a natural limit for the system (given that labels are produced by these various transcribers). However, lower error rates may be achieved by continuous training and fine-tuning of the model.

In some embodiments, once the ASR model is trained, the aforementioned processes may be performed by successively repeating the processes (e.g., fine tuning) for one or more text strings of a larger text string, where the one or more text strings contain one or more overlapping windows of text.

In some embodiments, Sentiment Predictive Model 324 may detect when a customer is becoming angry or dissatisfied. Aspect-based sentiment analysis may identify emotion and corresponding objects (products, services, etc.). This is particularly useful for customer calls as it helps agents identify which items need improvement to achieve higher customer satisfaction. The system performs aspect-based sentiment classification on a turn level (e.g., every time a new utterance is available). Performing this in real-time enables the system to track how sentiment changes over the course of a call. The interaction below is an example where the sentiment against a certain aspect changes.

[Agent] I would be happy to help you with viewing your payment history.
[Customer] Awesome. I hope I can get the app to work.
Aspect: app Sentiment: positive
[Agent] Once in the account summary page, please click on the account history to view previous transactions.
[Customer] This is useless. There is no way that this app can go back 6 months and show all the history at the same time.
Aspect: app
Sentiment: negative As can be seen in the interaction above, the sentiment against the app has changed over the course of the call. The sentiment predictive model's turn level analysis may also capture that the agent's instructions did not resolve the customer's issue.

This module is to not only capture sentiments for specific aspects, but also to understand a customers' emotions throughout a call. To that end, sentiments are not limited, for example, to a specific number of positive/negative sentiments: a range of emotions that affect customer satisfaction considered during classification. The example below shows a change of emotions during a call.

[Customer] I have been trying to make a payment for over an hour now and it's still stuck! Sentiment: angry
[Agent] I apologize for the inconvenience. I will be happy to assist you with your payment.
[Customer] Oh good. Finally, I'm talking to someone who can help.
Sentiment: hopeful
[Customer] Ah, I see. There it is. That payment button seemed to be hiding on my phone screen. Now that I found it, it'll be easier.
Sentiment: happy The Sentiment Predictive Model 324 is a classifier that may take in utterance text and provide an output label indicating an utterance's sentiment and aspect. In this context, aspect refers to the service/product that the customer shows emotion toward. For example, customers might be generally happy about being a customer of a bank, but they might complain about their interest rates. In this case, the aspect would be toward interest rates (e.g., the service/product the customer is referring to) and the sentiment would be negative. One goal may be to detect when conversation is headed in a direction (e.g., trending) containing disappointment, dissatisfaction, or a complaint. In this case, the model may trigger the Automated System Assistance system 122 for real-time support.

Figure 5:
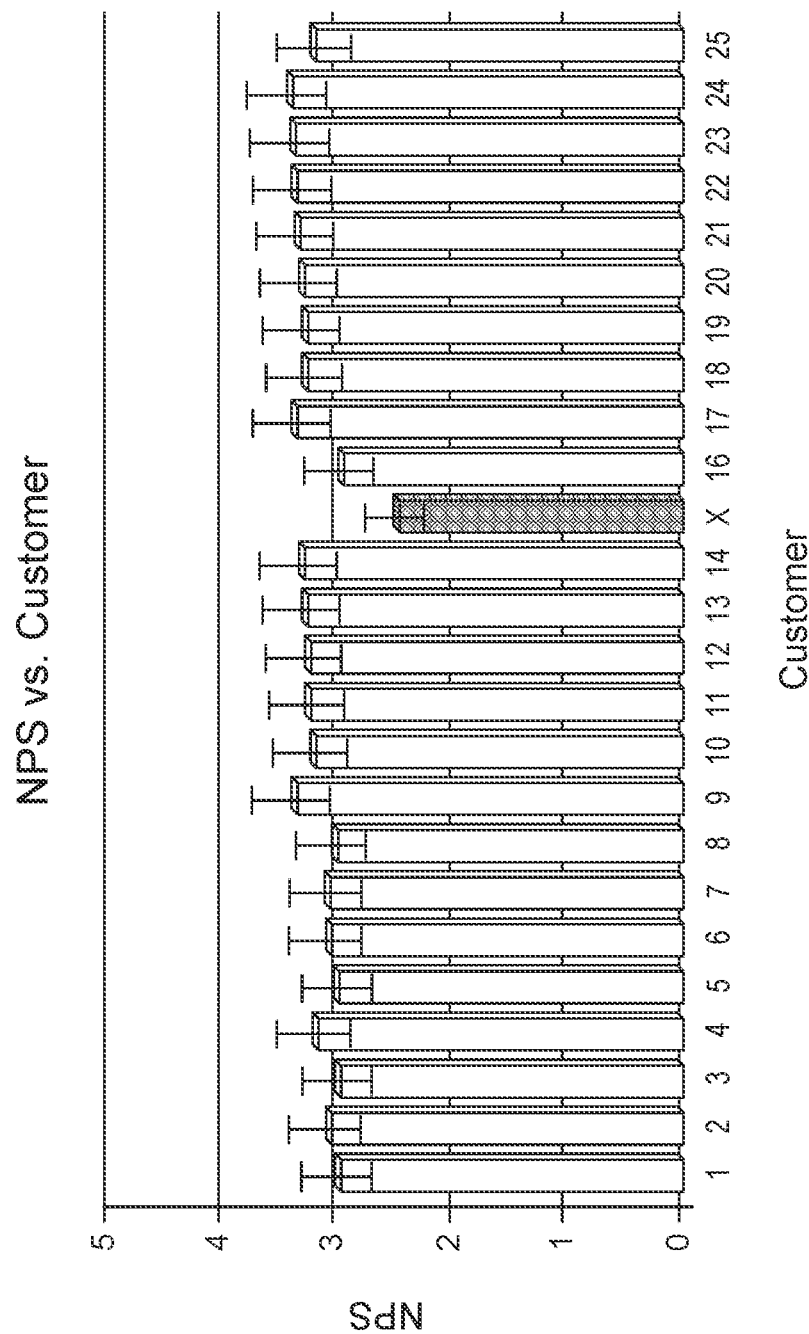
FIG. 5 illustrates customer satisfaction, as per some embodiments.

In some embodiments, the classifier may predict satisfaction based on the sentiment and a customer's previous satisfaction during previous calls. For example, previous call transcripts and corresponding NPS scores may be used as training data. Some customers might have a lower average score than the other customers. An average NPS scores in previous calls may be one output used for a future call prediction. FIG. 5 illustrates a case where most customers have an NPS score above 3, but the particular customer in this example has significantly lower scores. This would be an indication of overall discontent and may be addressed via routing the next call of this customer to an agent that generally gets higher scores from customers or possibly directly to a manager in order to increase the NPS score of the upcoming call.

In some embodiments, the classifier may also predict dissatisfaction based on the sentiment. In a non-limiting example, sentiments may include detected emotions belonging to a negative category (e.g., angry) or where the call's emotions have a downward trajectory (i.e., initial emotions were positive and subsequent emotions are intermediate). Sentiments, such as satisfaction, dissatisfaction, emotions, to name a few, may be extracted by the Sentiment Predictive Model 324 as preferences for a specific customer to build a profile or to modify (e.g., update) an existing customer profile.

In a non-limiting example, a caller's extracted preference may be to quickly become angry. Automated System Assistance system 122 may, based on an extracted preference of "anger", provide an alert to the call agent at the beginning of a new call from this customer to warn of this possibility, or the customer call router may route this customer to a more experienced agent or a call agent that has a high satisfaction rating. Alternatively, or in addition to, the system may provide the call agent with potential trigger words to look out for or to avoid or a historical average time to anger.

In some embodiments, a Complaint Predictive Model 326 predicts whether a historical call contains a complaint (e.g., tier 1) and can leverage this model on individual customer utterances. For a first task, machine-learning engine 302 may use the complaint predictive model 326 on the dialogue history (e.g., transcript) to classify previous complaints. Alternatively, or in addition to, for a second task, this model may classify current utterances during the call to predict whether the call up to the current time contains a complaint. For a third task, the system may predict whether a complaint is likely in the upcoming utterances. If the complaint score returned by the model exceeds a predetermined threshold, an automated agent assistance module 114 may be triggered to pre-warn or assist the agent during the call in handling the complaint.

In some embodiments, supervised training data may include calls that include known complaints. For model training, the system may use, as training data, outputs from the current sentiment predictive model 324. In a non-limiting example, the Sentiment Predictive Model 324 scores every utterance of a transcript (sentiment score). The information may include utterances with low sentiment scores that come right before utterances with high sentiment scores. Those utterances are positive examples.

Complaint predictive model 326 may also extract the customer's various reasons for calling as these reasons develop throughout the call. A call reason classifier may predict a call reason based on a historical review of the caller's reasons for calling against known call reasons of other customers. The model can leverage this prediction to determine an average number of calls with the same call reason (e.g., how many times did the customer have to call to resolve the problem vs. how many times others called to resolve a similar issue? Knowing the number of calls that a customer had to make to resolve the same issue with the same call reason will help predict the call reason of the upcoming call. Also, if the customer could not reach a satisfactory resolution, it is likely that they will call again with the same problem. The history about the calls and the details/actions taken about the problem would help guide next agent's choice of actions to resolve the problem.

In a non-limiting example, for each customer or agent utterance, the system may pass a call reason classifier over the utterance and update the customer profile with this information. In one non-limiting example, this model may be a L1 penalized Logistic Regression classifier, trained to identify, for example, one of many classes of call reasons in a snippet of call text. These call reasons range from topics (e.g., as shown in the below call record—balance transfers, hardship-based policies and procedures (hardship) and dispute times). An example of call text and the call reason identified in this text is given below.

balance_transfer_api—"I was wondering if there was a fee or, like, an interest charge if I transfer my balance from my first credit card to my second credit card"

hardship—"Yes my husband isn't working right now. His work was closed—it's a restaurant—his work was closed because of the coronavirus. I'm wondering if I may get a break on the amount that I pay each month until he finds another job."

disputes_time_to_resolve—"I called in a while ago about a charge that I didn't make and the person, the agent told me I may call to see when the charge would be taken off my card.

As the call is happening (i.e., in real time), a complaint is detected on the current utterance. Subsequent utterances may also be labeled as complaints. As the call history or current call continues, utterances may begin to have higher sentiment scores (happier) compared to previous utterances and thus not be labeled as a complaint, indicating that the complaint may have been resolved. In the example below, the Complaint Predictive Model 326 detects a complaint during the first three utterances. The model classifies the fourth utterances as a non-complaint. Since the subsequent utterances are also non-complaints, the system may capture the first few non-complaint utterances immediately after the complaint utterances as the resolution. In one non-limiting example, the system may recognize multiple tiers of complaints (e.g., Tier 1 and Tier 2). A Tier 1 complaint may be handled at the agent level whereas a Tier 2 complaint may require an escalation to the front-line manager. One example trends analysis is shown below.

[Customer] I can't believe I have this late fee.
Tier 1 inquiry—0.7 [Agent] I apologize and I will take a look at this issue for you.
Tier 1 inquiry—0.6
[Customer] I always pay on time. It's ridiculous that I'm charged a fee when I'm one day late.
Tier 1 inquiry—0.85
[Agent] I have good news. We are able to remove the late fee for you.
Non Tier 1-0.2
[Customer] Thank you, I appreciate that. Non Tier 1-0.05
[Agent] No problem, thanks for being a loyal customer.
Non Tier 1-0.06

For a fourth task, an average amount of time until complaint is detected may be predicted based on previous call history complaint time lines. For example, the average amount of time it takes for a given customer to have a complaint during a call is computed from the call histories and that information is provided to the agent in real-time so that agent has an expectation for the rest of the call and takes appropriate actions (i.e., providing a different set of solutions).

For a fifth task, an average number of words until complaint is detected may be predicted based on previous call history complaint word counts. Similar to the amount of time detected before a complaint is reached, the average number of words until a complaint occurred in historical calls for the given customer will be calculated to aid in predicting when a possible complaint is about to occur.

For a sixth task, finding a right set of agents to address customers' needs is an important part of increasing customer satisfaction. In some embodiments, the Complaint Predictive Model 326 may analyze previous NPS scores of a given customer with different agents that they interact with in the past. It is also possible that some agents have a better connection with some identified groups of customers (similar customers).

Once the complaint predictive model 326 is trained, the system may preemptively warn the agent that the customer may or is about to complain based on recognizing trends in sentiment scores. In one example embodiment, combining this capability with a similar customer predictive model 332 (described in greater detail hereafter), based on a call reason classification, will allow the system to provide fine-grained assistance to the agent. In some embodiments, complaint recognition is framed as a binary classification task (e.g., complaint/no complaint).

A call length predictive model 328 predicts a current call length based on a previous call length data and can leverage this model to determine a flow or cadence for a new call by the same caller. For a first task, machine learning engine 302 may use previous call length information to estimate how long the next call might be. For example, if a customer's previous call was intentionally kept at 5 minutes, that might mean that they are in a time crunch, might be at a new job or other factors that require their attention and therefore the future calls should be as to-the-point as possible. In some embodiments, call agents can shape their conversation with such a customer such that they aim to resolve the most important issue that the customer has instead of providing additional information on other services/products.

Figure 6:
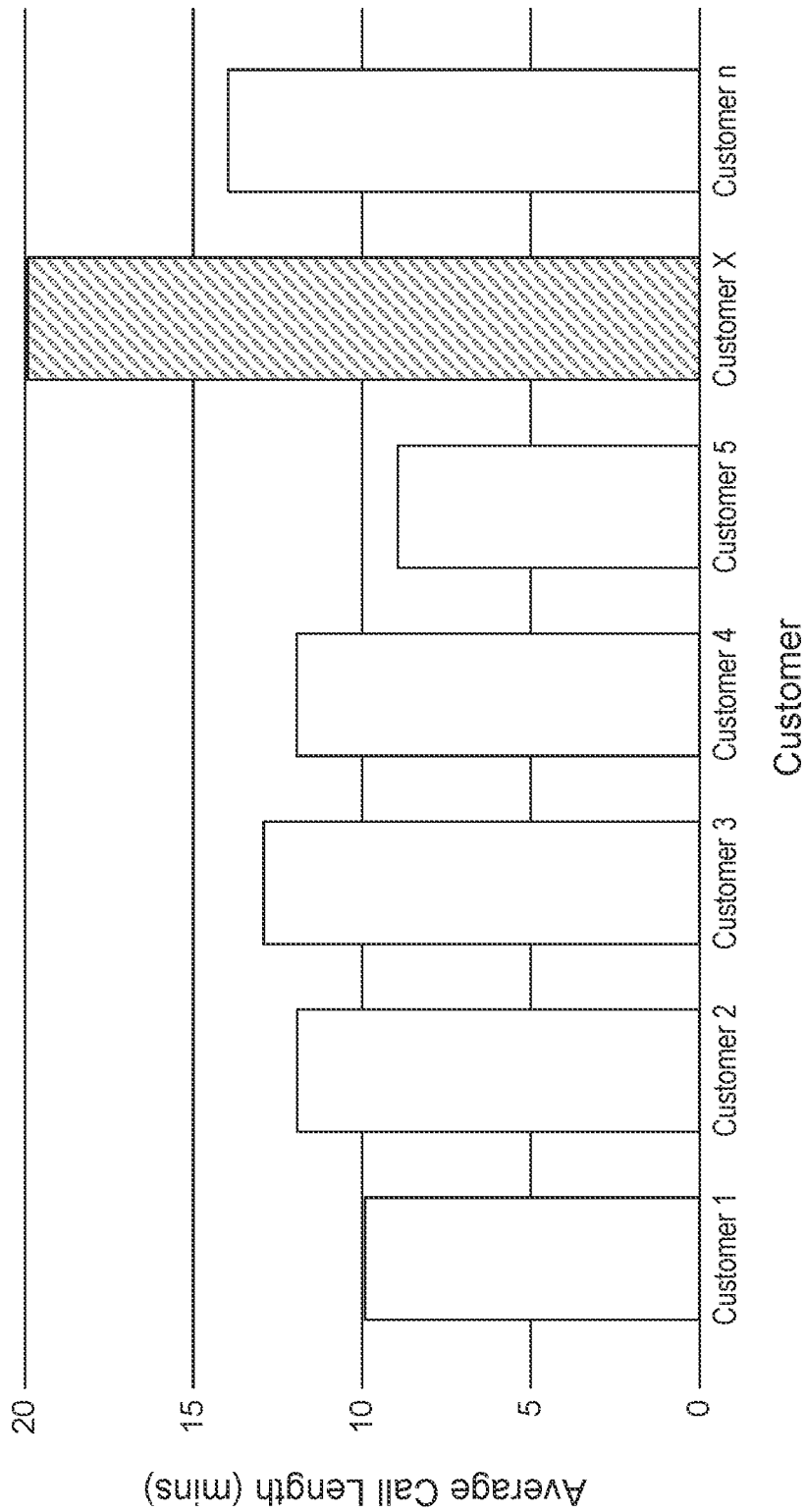
FIG. 6 illustrates average call length, as per some embodiments.

For a second task, machine learning engine 302 may use an average call length of the customer and how it compares to a set of other customers to set expectations for the call agent before the call begins. If the current customer routinely has significantly longer average call lengths than other customers, agents that are more successful with longer calls will be chosen for routing (e.g., more patient call agents). In a non-limiting example, FIG. 6 illustrates an average call length for n customers, with customer X representing a current customer. As shown, the current caller represents a long average call length and may require a higher level (e.g., more experienced) call agent or one who has a strong history of shorter resolutions. In addition, this information may also allow strategic decisions to be made such as predicting how many calls can be completed within the next hour depending on the incoming call volume, allocating more resources dynamically. The dynamic resource allocation may reduce long waiting times before these long wait times occur. This approach will forecast a number of agents needed based on the length of the calls they currently have.

Figure 7:
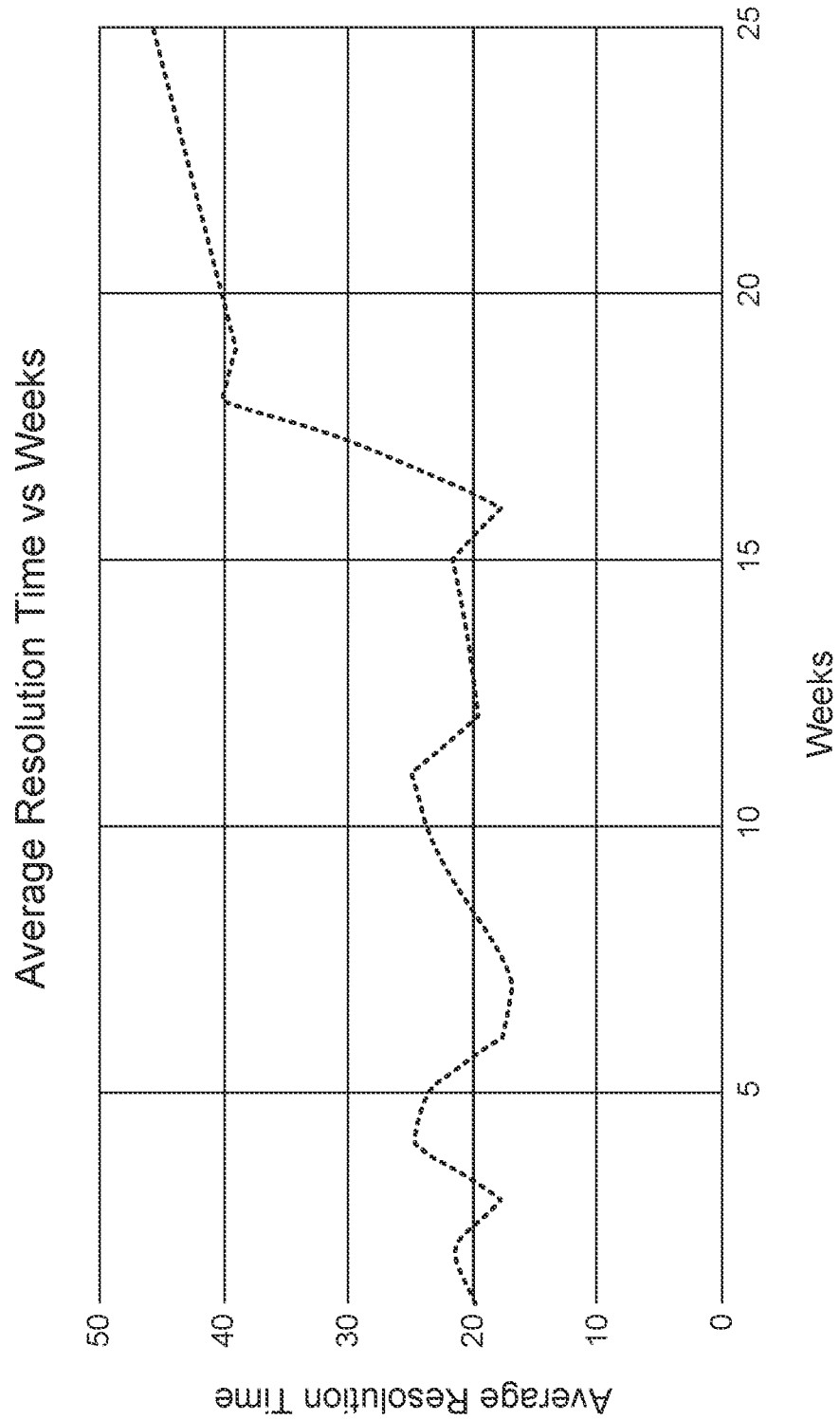
FIG. 7 illustrates average resolution time, as per some embodiments.

A call resolution predictive model 330 predicts a current call length based on an average resolution time for a given time frame and can leverage this model to determine a flow or cadence for a new call by the same caller. For a first task, machine learning engine 302 may compare a current customer's average resolution time to a current average of all customers. If the current average resolution time is around 20 minutes, it would be expected that the current customer's resolution time would be within a standard deviation of 20 minutes as well. A shorter resolution time would indicate an opportunity to celebrate the call agent who took the call. A longer resolution time may be an indication of a possible problem that the manager of the call agent can provide further support to the call agent and utilize that call as a coaching opportunity to improve the customer experience of the future calls. FIG. 7 illustrates an average resolution time for a given time frame, which will allow business owners to see trends in the corresponding call center. As shown, an increasing average time of resolution for the calls occurs at around week 16, which indicates a problem. It may be that a different set of topics are being talked about in the call centers, or related to a call agents' motivation or some other hidden factor that is worth investigating to resolve the problem.

Similar Customer Predictive Model 332 classifies customers into groups of similar customers. Similarities may be based on call reason, customer resolution history, average call time, sentiments and complaints, to name a few. In one example embodiment, a training set includes a large set of N previous user interactions (call data 310, customer speech 312 and customer profiles 314). Machine-learning engine 302 processes this training set to recognize call agent interactions with similar customers. For example, the call agent interactions may be interactions that previously resulted in successful outcomes based on specific call agent phrasing and associated subsequent actions/options selected. In some embodiments, the system uses the customer call history, but also finds similar customers to the current customer to enrich the list of phrases/words preferred to indicate requests and complaints. The similar customers are found by clustering the call transcripts of customers using word similarity metrics and finding the closest cluster to the current customer so that it can be considered as the set of most similar customers.

Once the similar customer predictive model 332 has been trained to recognize patterns of behavior that resulted in successful behavior, it may take as an input any future behavior and correlate to determine a higher likelihood of successful outcome. For example, the model may provide real-time similar phrasing (as described in greater detail hereafter) or actions or options classified by Phrasing Predictive Model 334 as suggestions to assist to call agents while they are in a current call session.

Phrasing Predictive Model 334 may, in one non-limiting example embodiment, use a deep learning approach to auto-generate text called seq2seq ("sequence to sequence") using as training data segments of transcripts in which a customer problem has been identified and includes corresponding agent responses to the articulated problem. Seq2seq models are trained on input/output pairs of sequences. In this specific example, the input sequence is the problem statement ("Your late-payment fees are exorbitant", etc.) and the output sequence is the agent's articulated response to the problem statement ("I understand your frustration with our late payment process", etc.). A seq2seq model may be trained on several hundred thousand such problem statement/agent response pairs, culled from past interactions. Seq2seq may be used for any task that involves learning to produce a sequence of tokens given some input sequence of tokens. In a non-limiting example, the training data may include question/answer pairs for conversational AI (e.g., input is question and output is answer).

For a first task, the most frequently used complaint words may be predicted based on previous call history complaint word counts. Each customer's call histories will be utilized to obtain a customer profile that summarizes the most frequently used words for indicating complaints. Some examples of such phrases may include: "This is not how it is supposed to be" "Definitely what I am looking for", and "Does not seem right". For this example, the customer is not indicating a strong opinion unlike other customers such as "absolutely not" or "not at all" but have a more lukewarm selection of words. Knowing this will help the agent to spot when the customer actually is feeling frustrated and personalize the experience according to the customer instead of waiting to hear the more strong words such as "this is useless".

Figure 8:
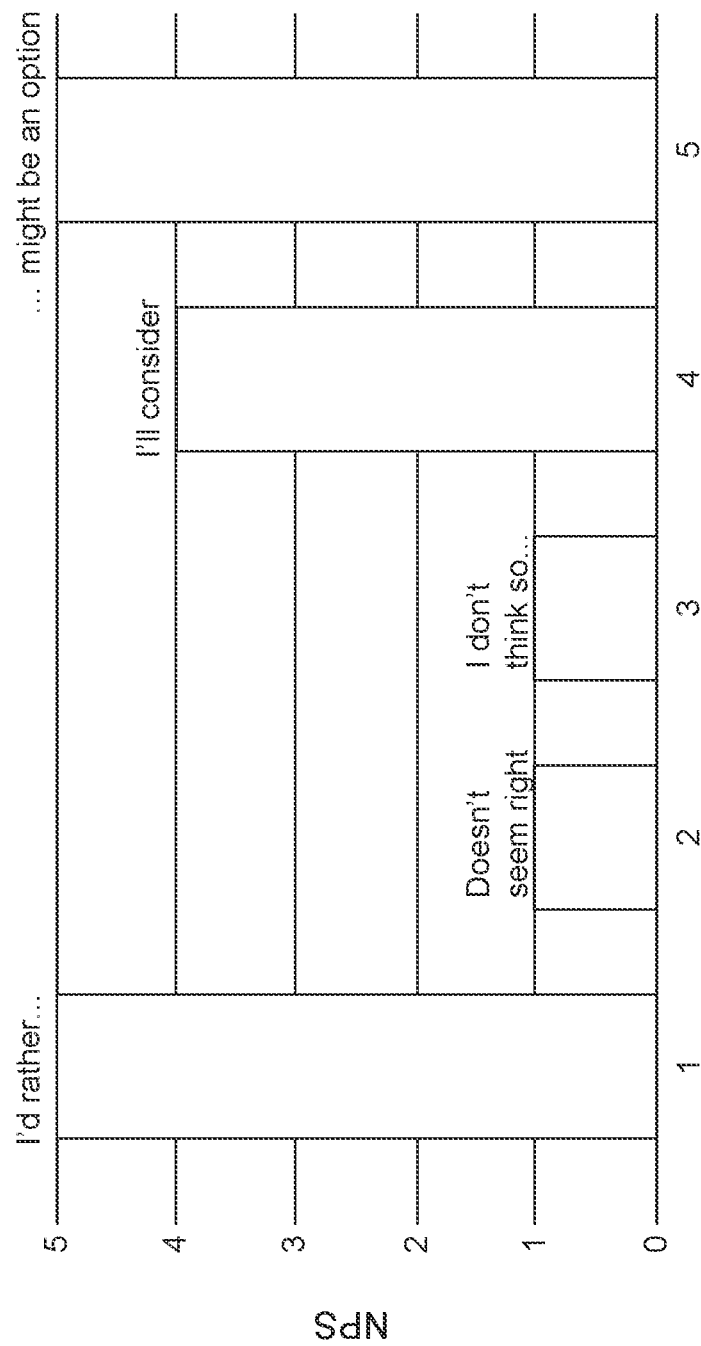
FIG. 8 illustrates call phrases, as per some embodiments.

FIG. 8 illustrates an example customer's interactions where the top three calls (NPS score 4 and 5) had the most common words "I'd rather", "I'll consider" and "might be an option", which are all neutral phrases. When the agent hears these phrases in an upcoming call, they can be more confident that the customer satisfaction is high for this customer. Similarly, when an agent hears "doesn't seem right" or "I don't think so", that would be an indication of low customer satisfaction and should be remedied immediately.

Figure 9:
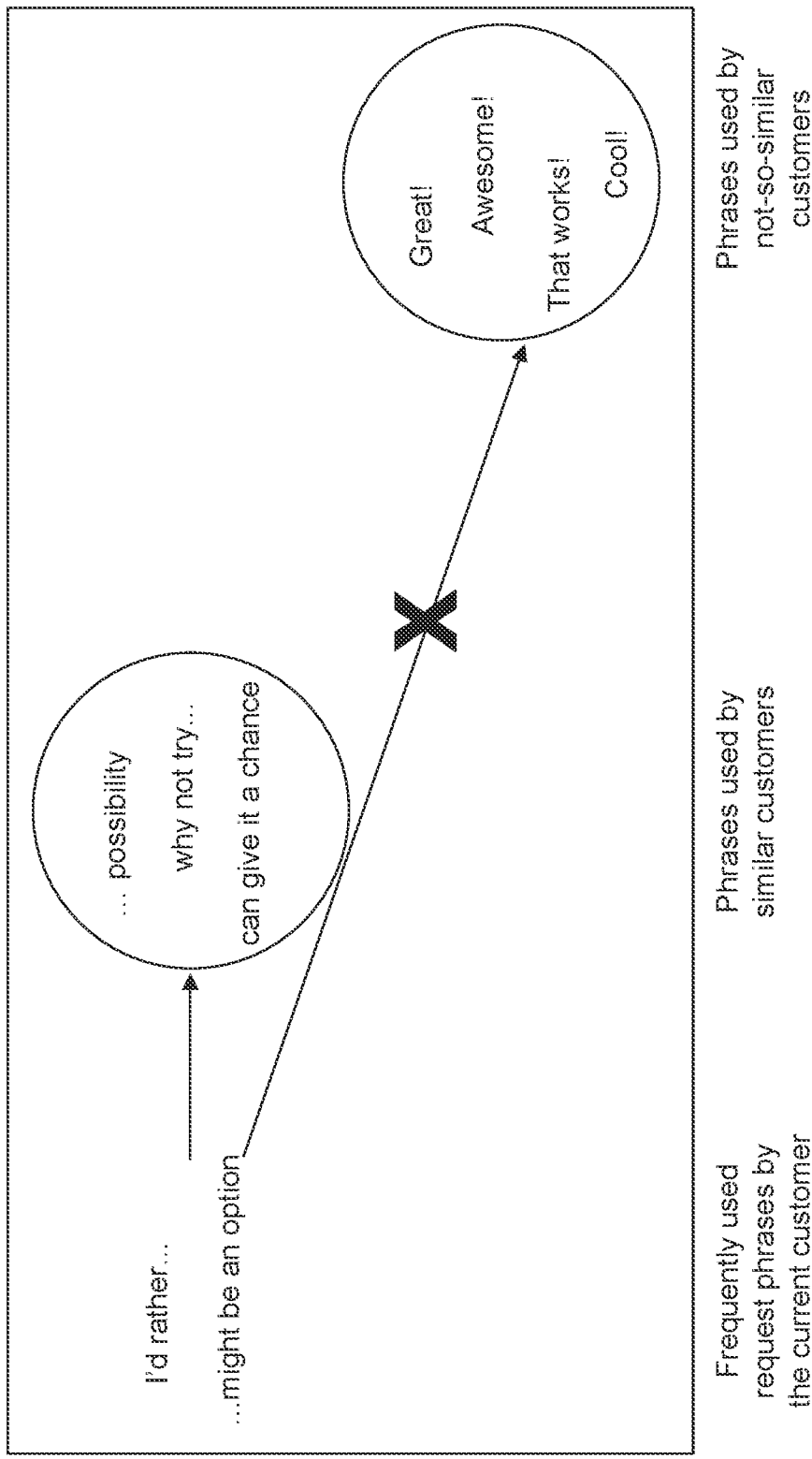
FIG. 9 illustrates call frequently used phrases, as per some embodiments.

FIG. 9 illustrates frequently used phrases for the given customer to request a service, the phrases used by the most similar customers as well as the least similar customers' phrases. The agent should not expect to hear "Great" or "awesome" from this customer when they are satisfied. Instead "possibility", "why not", "can give it a chance" phrases would be more likely to occur during the conversation to indicate positive sentiment by this particular customer.

Combined into the customer's customer profile with other data points such as sentiment, emotion, and trend/feedback score, call reasons are used to link customers to other customers with similar call reasons and the requisite workflow associated with those customers is recommended to the agent.

Routing predictive model 336 classifies a pending routing decision based on associated customer preferences. Routing may be based on any previously described preferences, such as, but not limited to, call reason, customer resolution history, average call time, sentiments and complaints. In one example embodiment, a training set includes a large set of N previous user interactions (call data 310, customer speech 312 and customer profiles 314). Machine-learning engine 302 processes this training set to recognize call routing decisions of similar customers (e.g., from Similar Customer Predictive model 332). For example, the call routing decisions may be a result of analyzing interactions that previously resulted in successful outcomes. Once the Similar Customers Predictive model 334 has been trained to recognize patterns of behavior that resulted in successful behavior, the Call Routing Predictive Model 336 may take as an input any future routing decisions and correlate to determine a higher likelihood of successful outcome.

Figure 10:
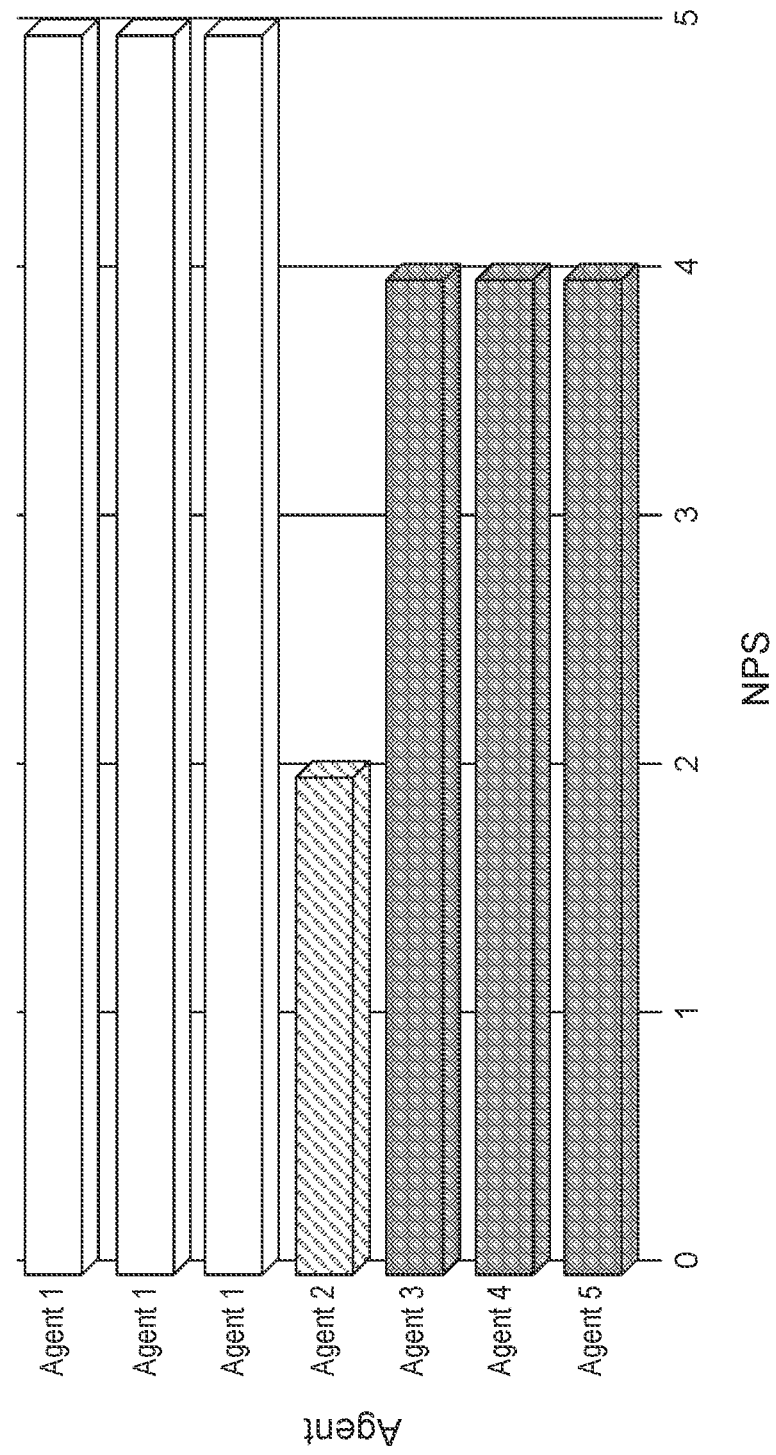
FIG. 10 illustrates call agent satisfaction, as per some embodiments.

FIG. 10 illustrates an example customer where Agent 1 gained higher NPS scores during their interaction with a customer whereas Agent 2 had significantly lower scores.

This information is beneficial to determine who should take this particular customer's call next. In order to increase customer satisfaction, the next call for this agent should be routed to Agent 1 if possible, if not it can go to any agent other than Agent 2. The calls that achieved high NPS scores as well as low NPS scores will be analyzed to extract cues that can be relevant for future calls.

Figure 11:
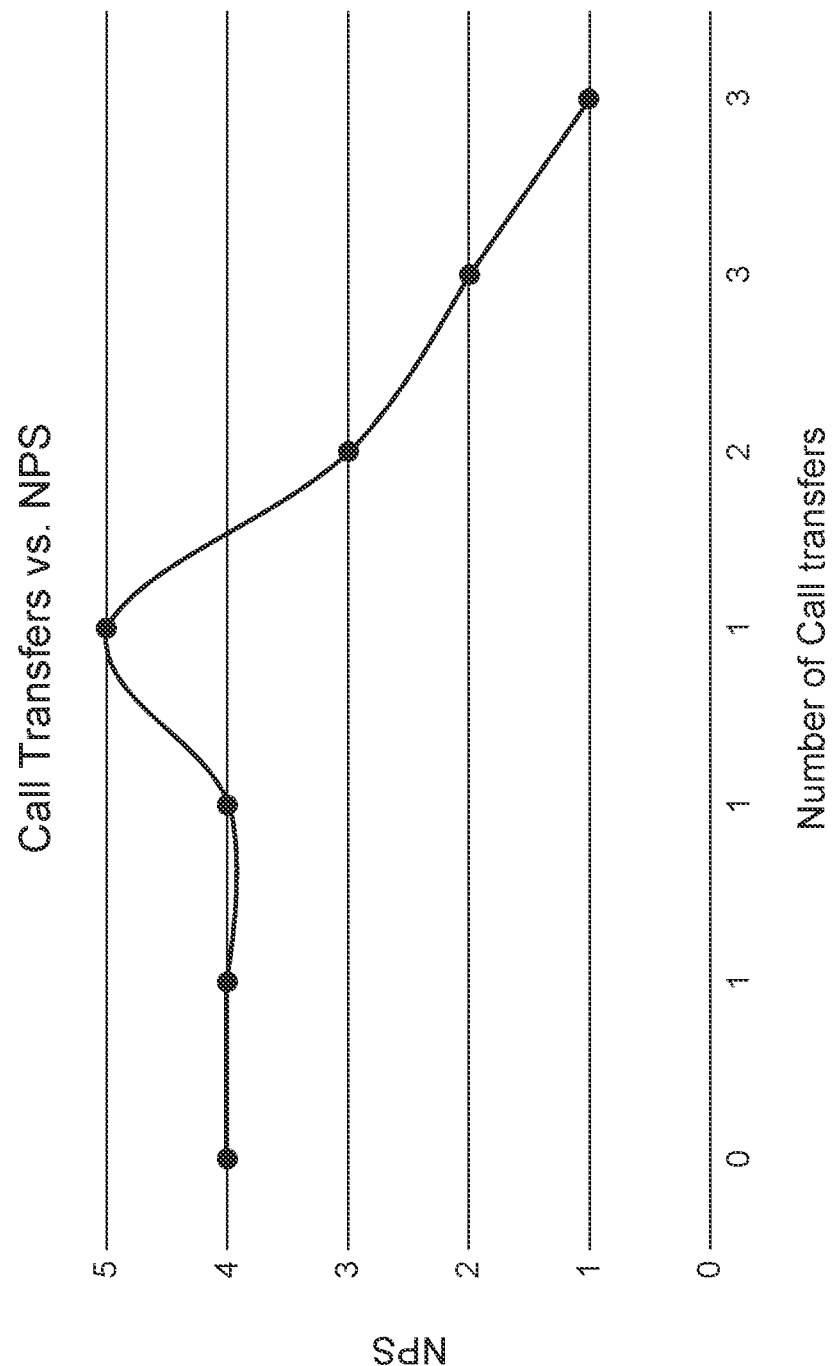
FIG. 11 illustrates call transfers, as per some embodiments.

The number of transfers that are performed while trying to resolve an issue during a call can affect customer satisfaction deeply. In a second task, Routing Predictive Model 336 analyzes a relationship between the number of call transfers and NPS from the call histories of a given customer. For example, FIG. 11 illustrates that the customer prefers to have 1 or less transfers during a call. With 2 and more transfers, the NPS score significantly decreases. The agents should use that information to try and resolve the issues by themselves if the customer had already 1 transfer for that particular call.

Figure 12:
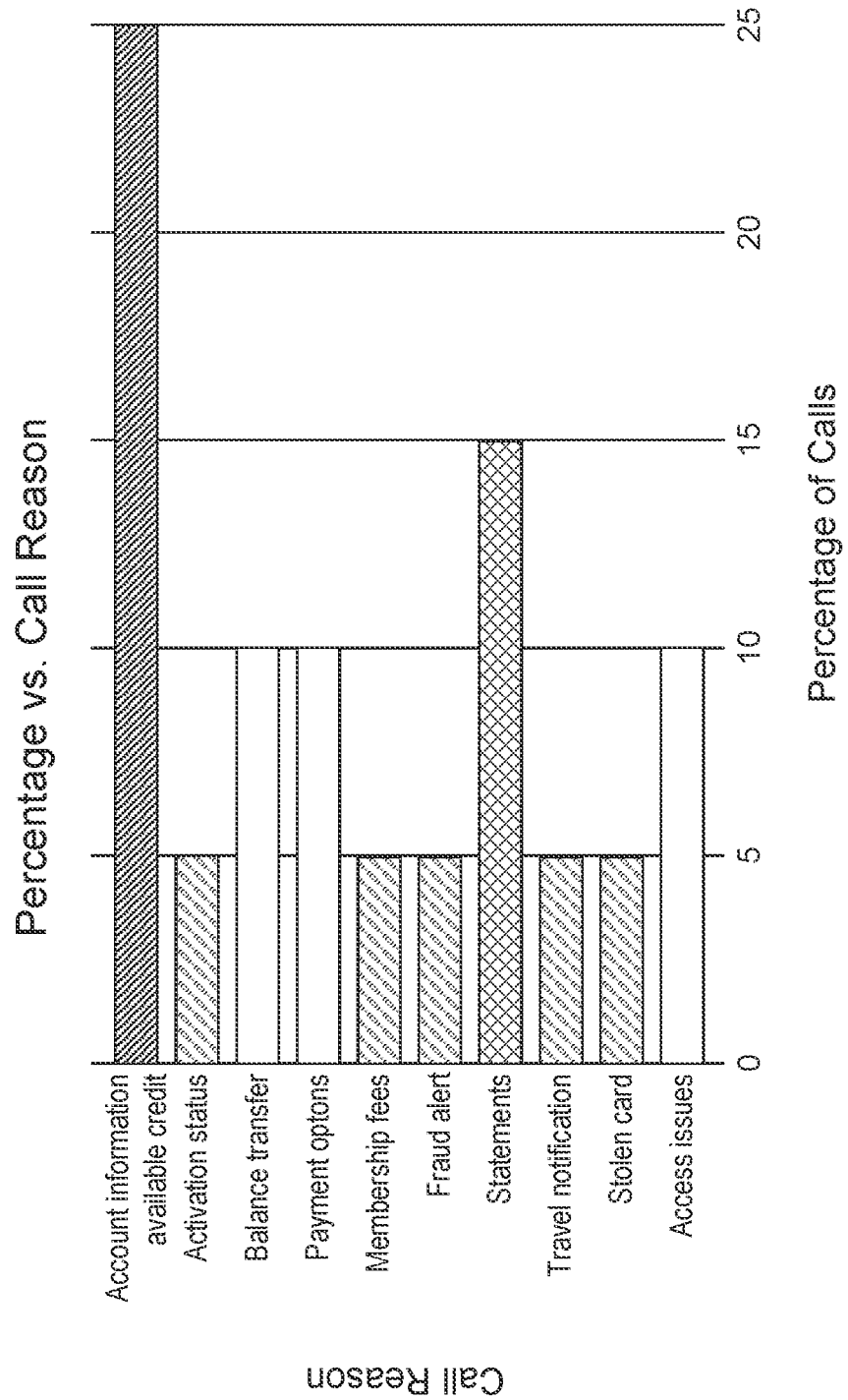
FIG. 12 illustrates a call reason distribution, as per some embodiments.

Outputs from the various predictive models may include, but not be limited to, information about the customer's previous call and will be provided to the agent so they can be informed about what steps had been taken and what worked/what did not work. The information about previous call may include, but not be limited to: a previous call's call reason, a previous call's NPS score and whether a complaint was detected in previous call or not. In addition, the technology described herein may generate a distribution of call reasons for the same customer to predict upcoming call reasons. FIG. 12 illustrates a case where this particular customer mostly calls about account information available credit and therefore the next call can be routed to an agent who has a lot of experience in account credit questions.

Figure 13:
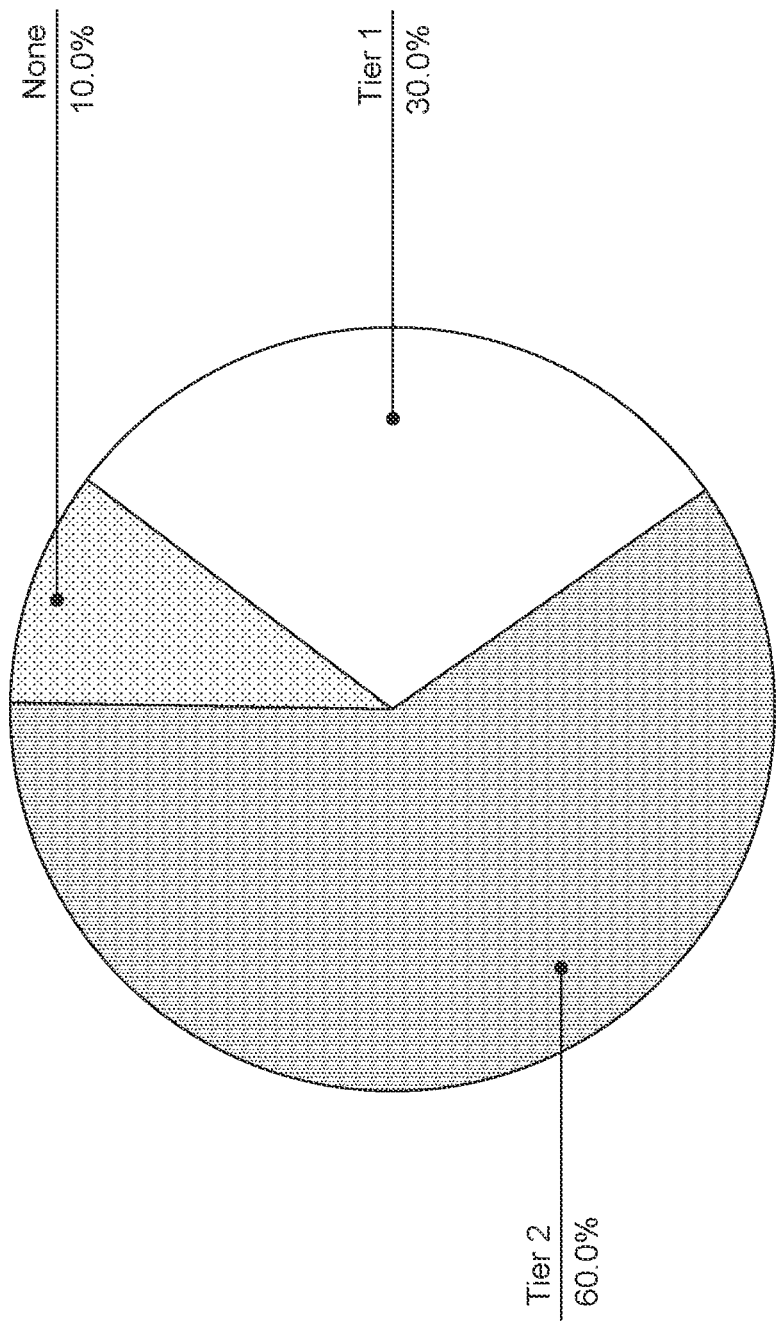
FIG. 13 illustrates percentage of complaints, as per some embodiments.

For a third task, a percentage of calls may be determined that contain Tier 1 and Tier 2 complaints. If the customer is known to make a lot of Tier 2 complaints, the call would be routed to a manager directly. FIG. 13 illustrates a case where an example customer generates a lot of Tier 2 inquiries. Connecting the customer directly to a Tier 2 agent can increase customer satisfaction rather than going through Tier 1 then Tier 2 agents.

The system is a framework that unites several machine learning models to better understand customers, intelligently route incoming calls based on this understanding and help call center agents converse with customers to achieve higher customer satisfaction in real time to improve the customer experience.

Figure 4:
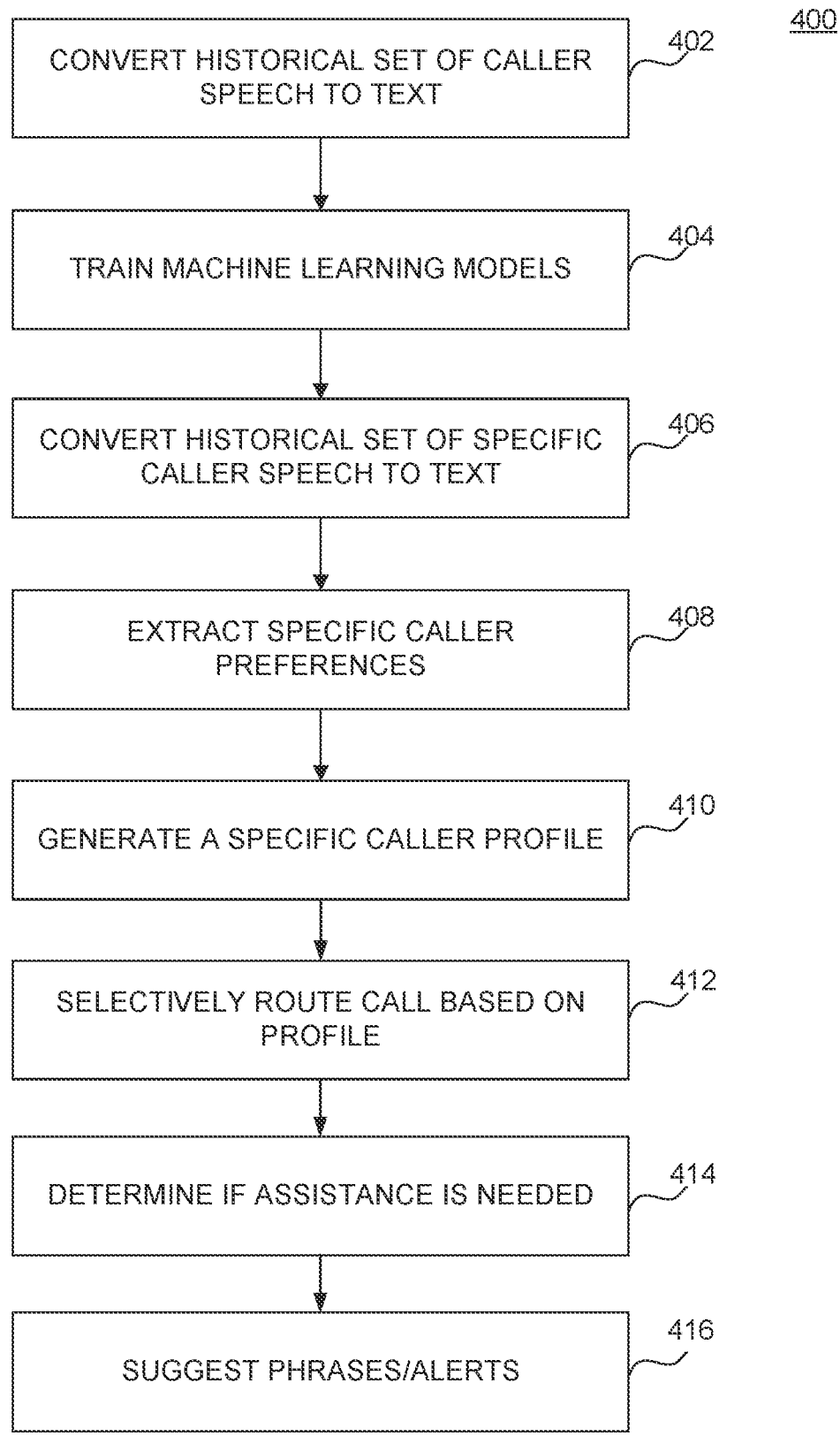
FIG. 4 is a flow diagram for real-time call processing, according to some embodiments.

FIG. 4 is a flow diagram for real-time call processing, according to some embodiments.

In 402, call center system 100 may convert, from speech to text, a plurality of first historical interactive communications of a set of first callers to generate training data. For example, large data sets (e.g., hundreds, thousands or more) of previous caller dialogs may be converted to text for input to machine learning system 300. This conversion may occur in real time as new calls are recorded or later in time in batches.

In 404, call center system 100 trains, using the training data, one or more machine learning models 306 to extract caller preferences from the plurality of first historical interactive communications. For example, machine learning engine 302 trains a sentiment predictive model 324 to detect or predict when a customer is becoming angry or dissatisfied. The system may, in some embodiments, perform aspect-based sentiment classification on a turn level (e.g., every time a new utterance is available). Performing this in real-time enables the system to track how sentiment changes over the course of a call. In another example, machine learning engine 302 trains a complaint predictive model 324 to detect or predict complaints within the first historical interactive communications. Other non-limiting examples may include, but not be limited to, training to predict call length, predict call resolution, infer similar customers, detect or predict customer phrasing, predict call center resources or infer call routing.

In 406, call center system 100 converts, from speech to text, one or more second historical interactive communications of a specific caller to generate input data for the machine learning system 300. In one non-limiting example, previous customers are processed by the machine learning system to learn their preferences in anticipation of future calls to the call center.

In 408, call center system 100 extracts, using the trained one or more machine learning models, caller preferences for the specific caller from the one or more second historical interactive communications of the specific caller. For example, the trained models may be implemented to extract a specific customer's sentiments in previous calls. The system may classify a detected complaint based on any of, emotions detected, subject matter detected, sound volume or intensity of the call utterances. For example, the system may detect caller specific words depicting anger. The machine learning engine 302 may also detect trends to predict whether a complaint is likely in the upcoming utterances. The system may preemptively warn the call agent that the customer previously has or is about to complain based on recognizing trends in sentiment scores.

In 410, call center system 100 generates a specific caller profile. The specific caller profile may aggregate customer preferences extracted from each of the plurality of machine learning models 306 or from combined functionality of two or more machine learning models. For example, an output from one machine learning model may be used as an input to another machine learning model. The specific caller profile may be generated in advance of a call, at the time of an incoming call or be updated over time.

In 412, call center system 100 may selectively route incoming calls to a call agent based on the specific caller profile. Call routing may be based on an analysis of pre-call information, such as a caller's profile, previous call interactions, voice menu selections or inputs to automated voice prompts. A machine learning engine 302 trains a routing predictive model 322 to recognize previous customers, customer areas of interest (credit card assistance, etc.) to infer (predict) a relevant call agent (or call agent group tasked with working with a specific category (e.g., credit card issues)). An incoming call is subsequently routed to a call agent.

In 414, call center system 100 may determine if assistance is needed. For example, if a sentiment score exceeds a predetermined threshold, an automated agent assistance module 122 may be triggered to assist the agent in handling the complaint. The call center system 100, after routing to a call agent, communicates one or more of the caller preferences for the specific caller to the call center agent for consideration in an interactive communication during the current call.

In 416, call center system 100 may suggest phrases that are considered relevant to previous successful outcomes of similar callers to be selected and communicated to the call agent. For example, the call agent will receive phrases displayed on their computer screen. Phrases may include, or be combined with, negative sentiment/emotion diffusing phrases, additional contextual information such as product descriptions, product suggestions, customer options or steps that may provide technical assistance.

In 416, call center system 100 may also provide one or more alerts to a screen of the call agent. For example, alerts may be designated in various categories, such as, important, critical, helpful support or manager needed. The alerts may be based on the sentiment score crossing various thresholds, triggering varying levels of assistance and associated alerts. A call agent may subsequently select the alert (e.g., with cursor) and receive suggested phrasing to assist the customer. In one non-limiting example, the alert may be the specific caller's predisposition to anger or complaints. In another non-limiting example, the call center system 100 may suggest trigger words associated with the specific caller's anger or how long before the specific caller typically rises to anger or complaints. In one non-limiting example, the alert may include a caller's average length of call or average time to resolution. While providing a few non-limiting examples above, any user preference related information may be used to warn, inform or otherwise assist the call agent to improve an outcome of the call and improve user experience.

Figure 14:
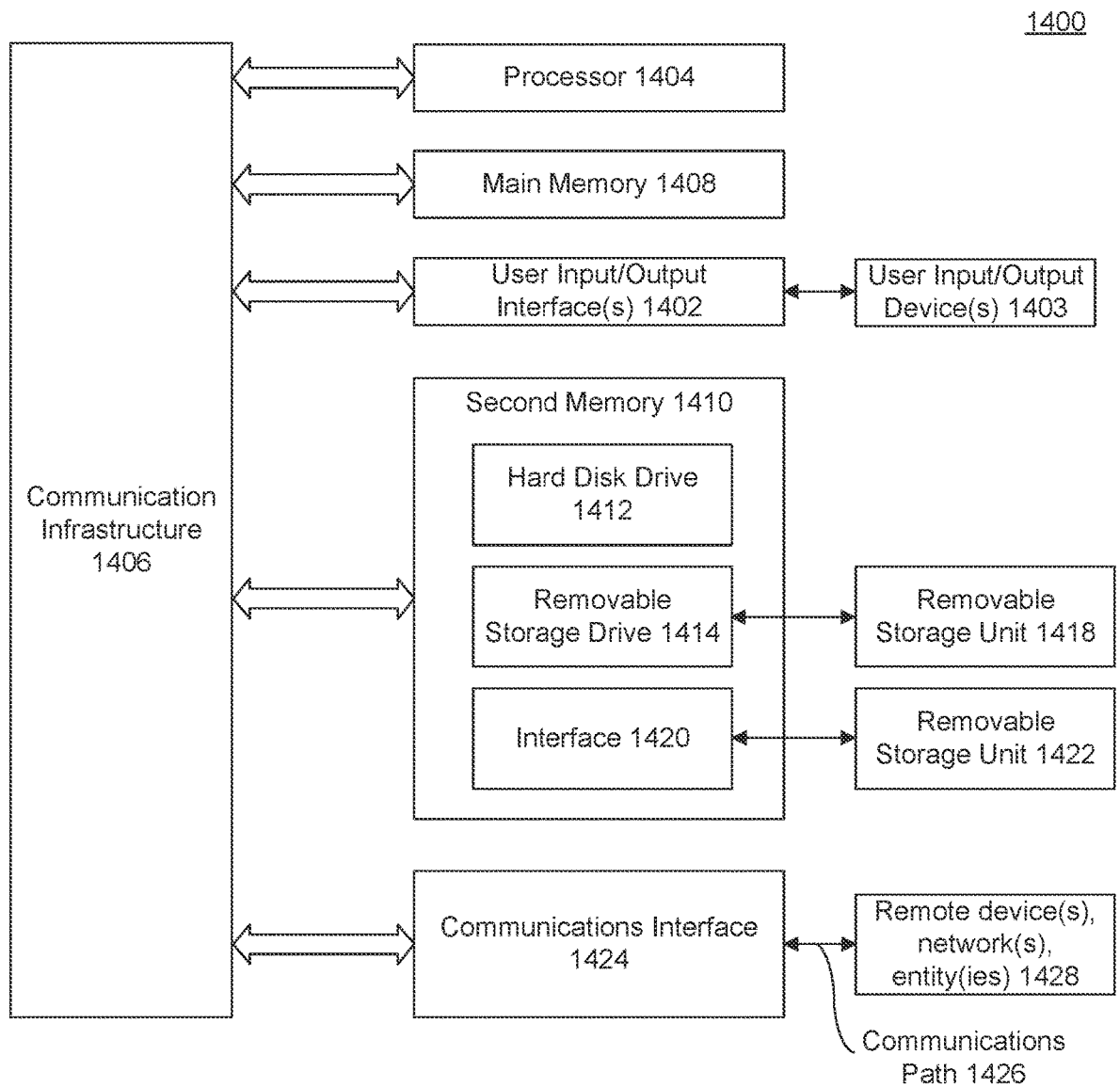
FIG. 14 is an example computer system useful for implementing various embodiments.

Various embodiments can be implemented, for example, using one or more computer systems, such as computer system 1400 shown in FIG. 14. Computer system 1400 can be used, for example, to implement method 400 of FIG. 4. Computer system 1400 can be any computer capable of performing the functions described herein. Computer system 1400 can be any well-known computer capable of performing the functions described herein.

Computer system 1400 includes one or more processors (also called central processing units, or CPUs), such as a processor 1404. Processor 1404 is connected to a communication infrastructure or bus 1406.

One or more processors 1404 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired, and/or wireless, and which may include any combination of LANs, WANs, the Internet, etc. Control logic and/or data may be transmitted to and from computer system 1400 via communication path 1426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
   a machine learning system configured to:
      convert, from speech to text, one or more historical interactive communications of a caller to generate input data;
      extract, from the input data and using a trained machine learning model, caller preferences of the caller from the one or more historical interactive communications of the caller; and
      generate, based on the caller preferences for the caller, a customer-specific profile;
   an automated call center assistance system configured to:
      communicate with the machine learning system to receive the customer-specific profile;
      selectively route, based on the customer-specific profile, a current call from the caller to a call center agent; and
      communicate one or more of the caller preferences for the caller to the call center agent for consideration in an interactive communication during the current call.

2. The system of claim 1, wherein the caller preferences comprise any of: word choices, call length, average call length, average call resolution time, average satisfaction level, or call reason.

3. The system of claim 2, wherein the automated call center assistance system is further configured to:
   estimate, based on the call length of the one or more historical interactive communications of the caller, the call length of the current call.

4. The system of claim 3, wherein the automated call center assistance system is further configured to:
   communicate the estimate of the call length of the current call to the call center agent.

5. The system of claim 2, wherein the automated call center assistance system is further configured to:
   dynamically determine, based on the average call length, a number of available call center agents.

6. The system of claim 2, wherein the automated call center assistance system is further configured to:
   determine, based on the average call resolution time for a given time period, a customer experience trend; and
   communicate the customer experience trend to the call center agent.

7. The system of claim 2, wherein the automated call center assistance system is further configured to:
   determine, based on an average number of the one or more historical interactive communications of the caller for the call reason, a distribution of potential call reasons for the current call; and
   communicate the distribution of potential call reasons to the call center agent.

8. The system of claim 2, wherein the machine learning system is further configured to:
   infer, based on one or more machine learning models and the one or more historical interactive communications of the caller, one or more complaints; and
   communicate the one or more complaints to the call center agent.

9. The system of claim 8, wherein the automated call center assistance system is further configured to:
   selectively route, based on the one or more complaints from the one or more historical interactive communications of the caller, the current call to the call center agent.

10. The system of claim 9, wherein the automated call center assistance system is further configured to:
    selectively route the current call to the call center agent based on a percentage of the one or more complaints within the one or more historical interactive communications of the caller exceeding a predetermined threshold.

11. The system of claim 8, wherein the automated call center assistance system is further configured to:
    determine an average amount of time before the one or more complaints is detected in the one or more historical interactive communications of the caller; and
    communicate the average amount of time to the call center agent.

12. The system of claim 8, wherein the automated call center assistance system is further configured to:
    determine a frequency of word choices, within the one or more historical interactive communications of the caller, occurring during the one or more complaints;
    rank the frequency of word choices; and
    communicate the rank of the frequency of word choices associated with the one or more complaints to the call center agent.

13. The system of claim 8, wherein the automated call center assistance system is further configured to:
    determine an average number of words before the one or more complaints are detected in the one or more historical interactive communications of the caller;
    predict when a potential one of the one or more complaints will occur; and
    communicate the prediction to the call center agent.

14. A computer-implemented method for processing a call, comprising:
- converting, from speech to text, one or more historical interactive communications of a caller to generate input data;
- extracting, from the input data using one or more trained machine learning models, caller preferences of the caller from the one or more historical interactive communications of the caller; and
- generating, based on the caller preferences for the caller, a customer-specific profile;
- selectively routing, based on the customer-specific profile and by an automated call center assistance system, a current call from the caller to a call center agent; and
- communicating, by the automated call center assistance system, one or more of the caller preferences for the caller to the call center agent for consideration in an interactive communication during the current call.

15. The computer-implemented method of claim 14, wherein the one or more caller preferences comprise any of: word choices, call length, average call length, average call resolution time, average satisfaction level, or call reason.

16. The computer-implemented method of claim 14, further comprising:
- inferring, based on the one or more trained machine learning models and the one or more historical interactive communications of the caller, one or more complaints; and
- communicating the one or more complaints to the call center agent.

17. The computer-implemented method of claim 16, further comprising:
- selectively routing the current call to the call center agent based on a percentage of the one or more complaints within the one or more historical interactive communications of the caller exceeding a predetermined threshold.

18. The computer-implemented method of claim 16, further comprising:
- determining a frequency of word choices, within the one or more historical interactive communications of the caller, occurring during the one or more complaints;
- ranking the frequency of word choices; and
- communicating the rank of the frequency of word choices associated with the one or more complaints to the call center agent.

19. A non-transitory computer-readable device having instructions stored thereon that, when executed by at least one computing device, cause the at least one computing device to perform operations comprising:
- converting, from speech to text, one or more historical interactive communications of a caller to generate input data;
- extracting, from the input data using one or more trained machine learning models, caller preferences of the caller from the one or more historical interactive communications of the caller; and
- generating, based on the caller preferences for the caller, a customer-specific profile;
- selectively routing, based on the customer-specific profile and by an automated call center assistance system, a current call from the caller to a call center agent; and
- communicating, by the automated call center assistance system, one or more of the caller preferences for the caller to the call center agent for consideration in an interactive communication during the current call.

20. The non-transitory computer-readable device of claim 19 further configured to perform operations comprising:
- inferring, based on another of the one or more trained machine learning models and the one or more historical interactive communications of the caller, one or more complaints from the one or more historical interactive communications of the caller; and
- communicating the one or more complaints to the call center agent.

* * * * *